(12) United States Patent
Nanno et al.

(10) Patent No.: US 6,909,413 B2
(45) Date of Patent: Jun. 21, 2005

(54) DISPLAY DEVICE

(75) Inventors: Yutaka Nanno, Takarazuka (JP); Kouji Senda, Nagaokakyo (JP); Shin-itsu Takehashi, Daito (JP)

(73) Assignee: Matsushita Electric Industrial Co., Ltd. (JP)

( * ) Notice: Subject to any disclaimer, the term of this patent is extended or adjusted under 35 U.S.C. 154(b) by 344 days.

(21) Appl. No.: 10/168,307

(22) PCT Filed: Oct. 29, 2001

(86) PCT No.: PCT/JP01/09489

§ 371 (c)(1),
(2), (4) Date: Jun. 20, 2002

(87) PCT Pub. No.: WO02/35507

PCT Pub. Date: May 2, 2002

(65) Prior Publication Data

US 2002/0196208 A1 Dec. 26, 2002

(30) Foreign Application Priority Data

Oct. 27, 2000 (JP) ........................................ 2000-328716
Dec. 19, 2000 (JP) ........................................ 2000-384840

(51) Int. Cl.[7] .............................................. G09G 3/36
(52) U.S. Cl. ........................................ 345/87; 345/211
(58) Field of Search ............................ 345/87, 92, 211,
345/89, 94, 95, 98, 99, 100, 204, 210; 315/169.1;
349/19, 33; 359/245; 327/536

(56) References Cited

U.S. PATENT DOCUMENTS 5,861,861 A * 1/1999 Nolan et al. ................ 345/87
5,986,649 A * 11/1999 Yamazaki ................... 345/211
6,137,466 A * 10/2000 Moughanni et al. ......... 345/99
6,166,726 A * 12/2000 Uchida et al. .............. 345/211
6,232,947 B1 * 5/2001 Miyawaki et al. ........... 345/99
6,236,394 B1 * 5/2001 Ikeda ......................... 345/211
6,404,271 B2 * 6/2002 Ayres ......................... 327/536
6,522,319 B1 * 2/2003 Yamazaki ................... 345/103
6,633,274 B1 * 10/2003 Yokota et al. .............. 345/100

FOREIGN PATENT DOCUMENTS

EP          1180762 A2 *  2/2002
JP          10-197900     7/1998
JP          10-268837    10/1998
JP          2000-284722  10/2000

* cited by examiner

*Primary Examiner*—Vijay Shankar
*Assistant Examiner*—Nitin Patel
(74) *Attorney, Agent, or Firm*—Parkhurst & Wendel, L.L.P.

(57) ABSTRACT

The present invention provides a liquid crystal display device having a liquid crystal display portion, a gate driver circuit, a source driver circuit, and a power supply circuit, where the liquid crystal display portion includes unit pixels with pixel switching elements and pixel electrodes arranged in a matrix. The pixel switching elements are thin film transistors that are made of polycrystalline silicon semiconductor formed on an insulating substrate. The power supply circuit is a charge pump-type power supply circuit, is made of a polycrystalline silicon semiconductor, and is a built-in circuit integrally formed on an insulating substrate. With such a configuration, a liquid crystal display device that greatly reduces power consumption is realized.

21 Claims, 21 Drawing Sheets

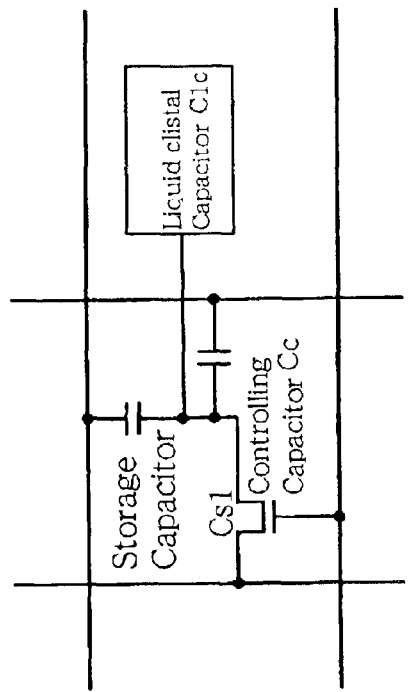
Fig.17 (c) Present Invention
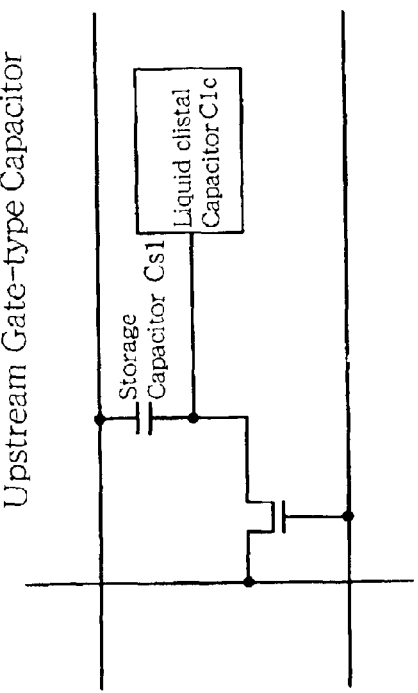
Fig.17 (a) Upstream Gate-type Capacitor
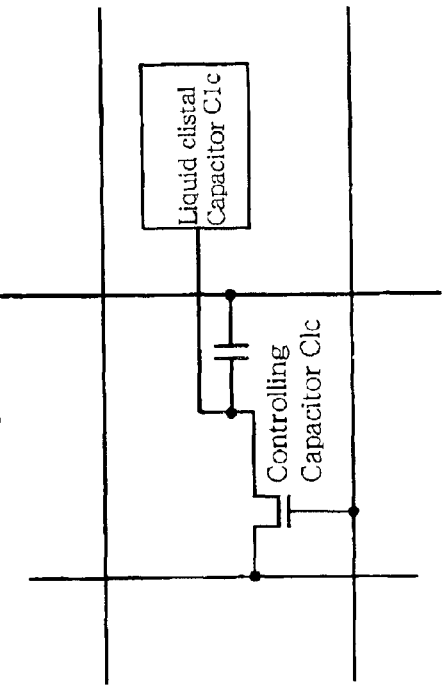
Fig.17 (b) Independent Electrode-Type Capacitor

DISPLAY DEVICE

TECHNICAL FIELD

The present invention relates to a display device that is suitable for the display portion of mobile phones and the like.

BACKGROUND ART

Liquid crystal display devices are thin and lightweight and have low power consumption. For these reasons, use in liquid crystal displays for laptop computers and notebooks, as well as for information display portions of personal digital assistants such as mobile phones, has become widespread.

Such conventional liquid crystal display devices are configured such that a required power supply voltage from an external power supply circuit is supplied to a driver circuit in the liquid crystal display panel. Specifically, a conventional power supply circuit, as shown in FIG. 21, is such that a reference voltage is stepped up to a high voltage by a booster circuit 140 including a transformer, this high voltage is divided by a voltage divider circuit 141 having a plurality of resisters (voltage divider resisters) connected in series, and a plurality of driving voltages V1–V3 (for example, V3=15, V2=5, V=−3) for driving the liquid crystal elements are generated from each of the points of voltage division via voltage followers 142.

In such a prior art example, there are the following problems.

1. Because the conversion efficiency of the booster circuit including the transformer is poor, the power consumption of this portion increases.

2. Because the boosted high voltages are divided by a plurality of voltage divider resistors connected in series in order to obtain the desired plurality of driving voltages, excess power consumption by the voltage divider resistors inherently arises with voltage division.

3. Because the power supply circuit is an external circuit, the reliability of the connection of the liquid crystal display panel with the driver circuit suffers.

DISCLOSURE OF THE INVENTION

It is an object of the present invention to overcome the foregoing problems by providing a display device that realizes an improvement in the reliability of a connection between a power supply circuit and a driver circuit and a significant reduction in power consumption.

In order to overcome the foregoing problems, the first aspect of the invention provides a display device comprising: a display portion having unit pixels arranged in a matrix, each unit pixel having a pixel switching element and a pixel electrode; a gate driver circuit for supplying scan signals to gate lines; a source driver circuit for supplying image signals to source lines; and a power supply circuit for generating power supply voltages for driving the gate driver circuit and the source driver circuit from an inputted reference power supply voltage and supplying the power supply voltages for driving to the gate driver circuit and the source driver circuit; wherein the pixel switching elements are thin film transistors made of a polycrystalline silicon semiconductor formed on an insulating substrate; the power supply circuit is a charge pump-type power supply circuit; and the power supply circuit is made of a polycrystalline silicon semiconductor and is a built-in circuit integrally formed on the insulating substrate.

By using such a charge pump-type power supply circuit, the need for a voltage divider circuit such as that of the prior art example is eliminated, making it possible to reduce power loss caused by a voltage divider circuit or the like and to realize a low power consumption liquid crystal display device with a power supply circuit having excellent voltage conversion efficiency.

In addition, by integrally forming the power supply circuit on an insulating substrate, connection defects that arise with an external power supply circuit are eliminated, whereby reliability is improved. A reduction in production costs also is realized.

The second aspect of the invention according to the first aspect of the invention is such that the display portion is a liquid crystal display portion.

The third aspect of the invention according to the first aspect of the invention is such that: the display portion is an EL display portion for carrying out display with light emitted from EL elements and the unit pixels of the EL display portion each comprise, in addition to the switching element and the pixel electrode; a current controlling element for controlling current amount to the EL elements, and the current controlling elements are thin film transistors made of a polycrystalline silicon semiconductor formed on an insulating substrate.

The fourth aspect of the invention according to the first aspect of the invention is such that: each of the unit pixels comprises a voltage controlling capacitor having one electrode connected to the pixel electrode and comprises voltage controlling capacitor wiring for supplying a compensation voltage signal connected to the other electrode of the voltage controlling capacitor; the voltage controlling capacitor wiring is connected to a compensation voltage-applying driver circuit for changing the potential of the compensation voltage signal after completion of writing to each of the pixels to modulate the potentials of the pixel electrodes; and the power supply circuit, in addition to generating power supply voltages for driving the gate driver circuit and the source driver circuit, generates a power supply voltage for driving supplied to the compensation voltage-applying driver circuit.

With this configuration, a liquid crystal display device can be realized that uses a system of independent capacitively coupled driving based on digital image signals. By employing a system of independent capacitively coupled driving for the driving system, a reduction in power consumption is realized.

The fifth aspect of the invention according to the fourth aspect of the invention is such that taking Cs to be the capacitance value of the voltage controlling capacitor, Cs satisfies Equation 1:

$$Cs = (Vbias/Vepp) \cdot Ctot \quad (1)$$

where Vbias is change in pixel voltage caused by change in the compensation voltage, Vepp is the voltage amplitude of the compensation voltage signal, and Ctot is the sum of the voltage controlling capacitance, the parasitic capacitance, and the liquid crystal capacitance.

Specifically, Vbias is change in pixel voltage caused by change in compensation voltage, Vepp is voltage amplitude of the compensation voltage signals, and Ctot is the sum of voltage controlling capacitance, parasitic capacitance, and liquid crystal capacitance.

Setting Cs so that Equation 1 is satisfied makes it possible to optimally drive liquid crystal at a minimum voltage amplitude. Thus, power consumption can be further reduced.

The sixth aspect of the invention according to the fifth aspect of the invention is such that the voltage amplitude Vepp of the compensation voltage signal is represented by n times the reference supply voltage inputted to the power supply circuit, where n is a natural number and is set within the range $1 \leq n \leq 4$.

With this configuration, an increase in leak current can be suppressed and a liquid crystal display device with a high aperture ratio realized.

The seventh aspect of the invention according to the sixth aspect of the invention is such that the voltage amplitude of the scan signal is m times the reference power supply voltage, where m is a natural number and is set so that the voltage amplitude of the scan signal is a minimum voltage value in a voltage range in which writing of image signals to the unit pixels is possible.

With this configuration, pixel switching elements can be turned on and image signals written, the scan signals being set at a minimum voltage amplitude. Thus, it is made possible to sufficiently drive the liquid crystal and to realize a reduction in power consumption.

The eighth aspect of the invention provides a display device comprising: a display portion having unit pixels arranged in a matrix; a gate driver circuit for supplying scan signals to the gate lines; a source driver circuit for supplying digital image signals to the source lines; a power supply circuit for generating power supply voltages for driving the gate driver circuit and the source driver circuit from an inputted reference power supply voltage and supplying the power supply voltages for driving to the gate driver circuit and the source driver circuit; wherein each of the unit pixels is divided into a plurality of sub-pixels; each of the sub-pixels has a sub-pixel electrode and a sub-pixel switching element comprising a thin film transistor made of a polycrystalline silicon semiconductor formed on an insulating substrate; the power supply circuit is a charge pump-type power supply circuit; and the power supply circuit is made of a polycrystalline silicon semiconductor and is a built-in circuit integrally formed on the insulating substrate.

With this configuration, a display device for carrying out gray scale base on digital image signals can be realized.

The ninth aspect of the invention according to the eighth aspect of the invention is such that the display portion is a liquid crystal display portion.

The tenth aspect of the invention according to the eighth aspect of the invention is such that: the display portion is an EL display portion for carrying out display with light emitted from EL elements and the sub-pixels of the EL display portion each comprise, in addition to the sub-pixel switching element and the sub-pixel electrode, a current controlling element for controlling current amount to the EL elements; and the current controlling element is a thin film transistor made of a polycrystalline silicon semiconductor formed on the insulating substrate.

The eleventh aspect of the invention according to the eighth aspect of the invention is such that each of the sub-pixel electrodes has an area corresponding to a weighting of the digital image signals.

With this configuration, gray scale display with improved display quality is made possible.

The twelfth aspect of the invention according to the eighth aspect of the invention has a wiring configuration such that the gate lines are wired to each of the sub-pixels and a given one of the source lines is commonly wired to all of the sub-pixels.

For the wiring configuration of the sub-pixels, a wiring configuration such that the source lines are wired to every sub-pixel and the gate lines are commonly wired to all of the sub-pixels is also conceivable. However, when such a wiring configuration is applied to the wiring configuration of R, G, and B sub-pixels in a display device having full color display, the number of connecting wires increases, possibly inviting an increase in connection defects resulting from the considerable increase in connecting pins and the occurrence of degradation in image quality including display defects. With regard to this point, when the wiring configuration of the present invention is employed, the number of connecting wires does not increase significantly even if applied to a wiring configuration of R, G, and B sub-pixels in a liquid crystal display device having full color display, and thus the problems described above are overcome.

The thirteenth aspect of the invention according to the ninth aspect of the invention is such that: each of the sub-pixels comprises a voltage controlling capacitor having one electrode connected to the sub-pixel electrode and comprises voltage controlling capacitor wiring for supplying a compensation voltage signal connected to the other electrode of the voltage controlling capacitor; the voltage controlling capacitor wiring is connected to a compensation voltage-applying driver circuit for changing the potential of the compensation voltage signal after completion of writing to each of the sub-pixels to modulate the potential of the sub-pixel electrodes; and the power supply circuit, in addition to generating power supply voltages for driving the gate driver circuit and the source driver circuit, generates a power supply voltage for driving supplied to the compensation voltage-applying driver circuit.

With this configuration, a liquid crystal display device can be realized that uses a system of independent capacitively coupled driving based on digital image signals. By employing a system of independent capacitively coupled driving for the driving system, a reduction in power consumption is realized.

The fourteenth aspect of the invention according to the thirteenth aspect of the invention is such that each of the sub-pixel electrodes has an area corresponding to a weighting of the digital image signals.

With this configuration, gray scale display with improved display quality is made possible.

The fifteenth aspect of the invention according to the thirteenth aspect of the invention is such that the sub-pixel switching elements each have an ON current efficiency corresponding to a weighting of the digital image signals.

With this configuration, the pixel transistors have an ON current efficiency corresponding to the sizes of the electrodes of the sub-pixels, making it possible to sufficiently write image signals. Setting of the ON current efficiency of the pixel transistors may be such that the channel width is varied, the channel length is varied, or both the channel width and the channel length are varied.

The sixteenth aspect of the invention according to the thirteenth aspect of the invention is such that each of the voltage controlling capacitors are formed so as to have a capacitance value corresponding to a weighting of the digital image signals.

With this configuration, fluctuation in the electrode potential of each sub-pixel can be reduced to the greatest possible degree and an improvement in display quality realized.

The seventeenth aspect of the invention according to the thirteenth aspect of the invention is such that between each upstream gate line of the gate lines and the corresponding pixel electrode, a storage capacitor is formed.

With this configuration, in each of a plurality of sub-pixels, the required load capacitance can be obtained.

Improvement in the holding characteristics of each sub-pixel and prevention in degradation of image quality is thus possible.

The eighteenth aspect of the invention according to the first aspect of the invention is such that the gate driver circuit and the source driver circuit are made of a polycrystalline silicon semiconductor and are built-in circuits integrally formed on the insulating substrate.

By thus making all peripheral driver circuits built-in driver circuits, power consumption can be significantly reduced and a reduction in the weight and the thickness of an entire display device can be realized.

The nineteenth aspect of the invention according to the first aspect of the invention is such that the source driver circuit is formed of a monocrystalline silicon semiconductor, and the gate driver circuit is formed of a polycrystalline silicon semiconductor and is a built-in circuit integrally formed on the insulating substrate.

With this configuration, the thickness of the transistors can be increased and capacitance reduced more than is possible when a signal-line side circuit is made a built-in circuit formed of a polycrystalline silicon semiconductor, and it is thereby possible to reduce the power consumption of the source driver circuit.

The twentieth aspect of the invention according to the fourth aspect of the invention is such that the gate driver circuit, the source driver circuit, and the compensation voltage-applying driver circuit are made of a polycrystalline silicon semiconductor and are built-in circuits integrally formed on the insulating substrate.

By thus making all peripheral driver circuits built-in driver circuits, power consumption can be significantly reduced and a reduction in the weight and the thickness of an entire display device can be realized.

The twenty-first aspect of the invention according to the first aspect of the invention further comprises a level shifter circuit for supplying controlling signals to the gate driver circuit and the source driver circuit and is such that the level shifter circuit is formed of a polycrystalline silicon semiconductor and is a built-in circuit integrally formed on the insulating substrate.

With this configuration further reduction in the weight and the thickness of the entire display device can be realized.

BRIEF DESCRIPTION OF THE DRAWINGS

FIGS. 17(a), 17(b), and 17(c) are diagrams showing the configuration of capacitors in embodiment 3 and the prior art example, respectively, 17(a) and 17(b) being diagrams showing the configuration of capacitors of the prior art example and 17(c) being a diagram showing the configuration of capacitors of the present invention.

BEST MODE FOR CARRYING OUT THE INVENTION

Embodiment 1

Figure 1:
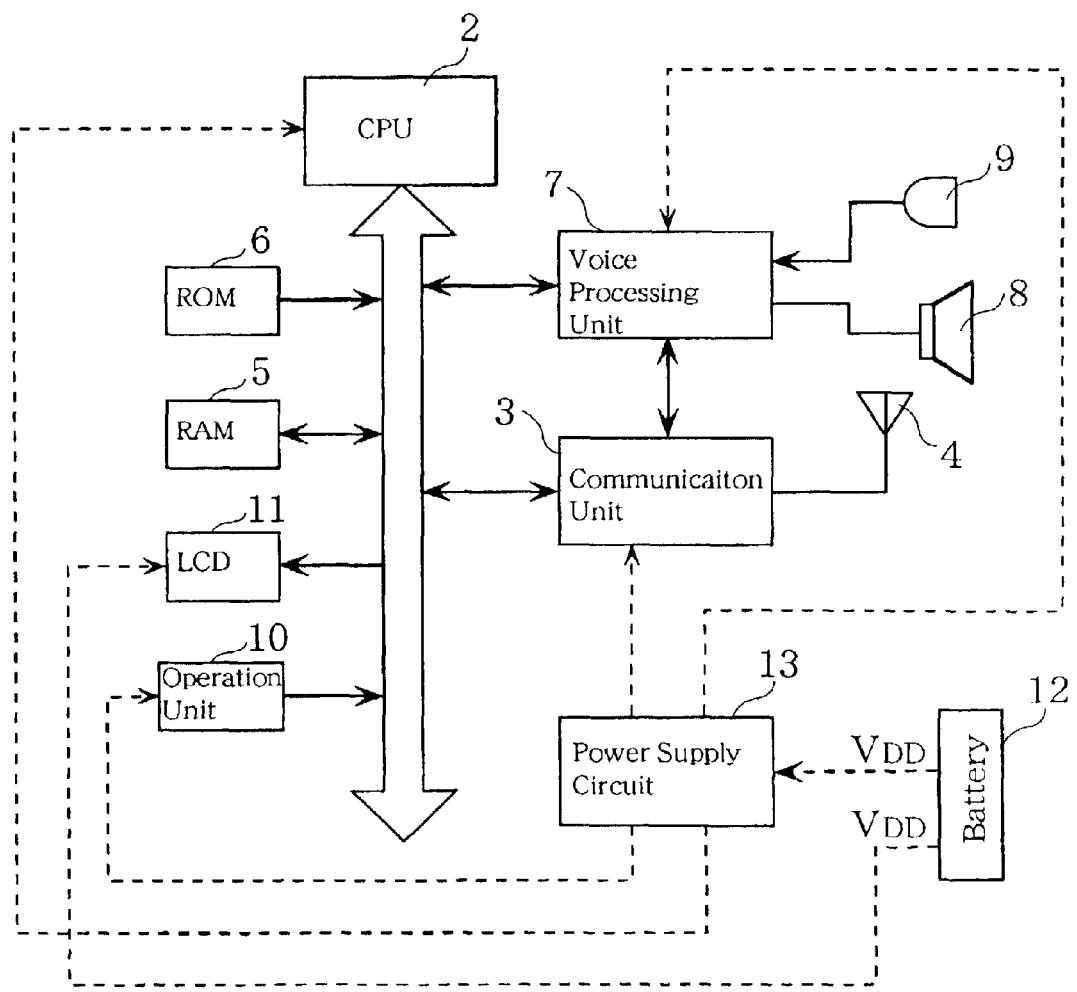
FIG. 1 is a block diagram showing the electrical configuration of a mobile phone 1 including a liquid crystal display device of the present invention.

FIG. 1 is a block diagram showing the electrical configuration of a mobile phone 1 having a liquid crystal display device according to the present invention. In FIG. 1, reference numeral 2 denotes a CPU (central processing unit) for controlling the operation of each part of the mobile phone by executing phone function programs. Reference numeral 3 denotes a communication unit which is connected to an antenna 4 and which has functions of modulating transmitter signals and demodulating receiver signals. Reference numeral 5 denotes a random access memory (RAM) which is, for example, a memory for storage of user setting data or the like. Reference numeral 6 is a read only memory (ROM) in which phone function programs for reception and transmission that are executed by the CPU 2 are stored in advance. Reference numeral 7 is a voice processing unit for decoding receiver signals demodulated at the communication unit 3 and delivering voice output via a speaker 8, while at the same time, compressing and encoding voice signals for transmission supplied from a microphone 9 to make transmission possible via the communication unit 3 under control by the CPU 2. Reference numeral 10 denotes an operation unit provided with a number pad and function keys. Reference numeral 11 denotes a liquid crystal display device where display is realized in response to operation of the phone function menu, the number pad, and the function keys.

Reference numeral 12 denotes a battery. Direct current power supply from the battery 12 is provided to the power supply circuit 13, required driving voltages are generated for each of the parts of the mobile phone (except the liquid crystal display device 12), and these voltages are supplied to the each part of the mobile phone.

As is discussed later, the liquid crystal display device 12 is configured such that it is connected in series with the battery 12 and such that required driving voltages are generated by the power supply circuit in the liquid crystal display device 12 and supplied to the driver circuit in the liquid crystal display device 12.

Figure 2:
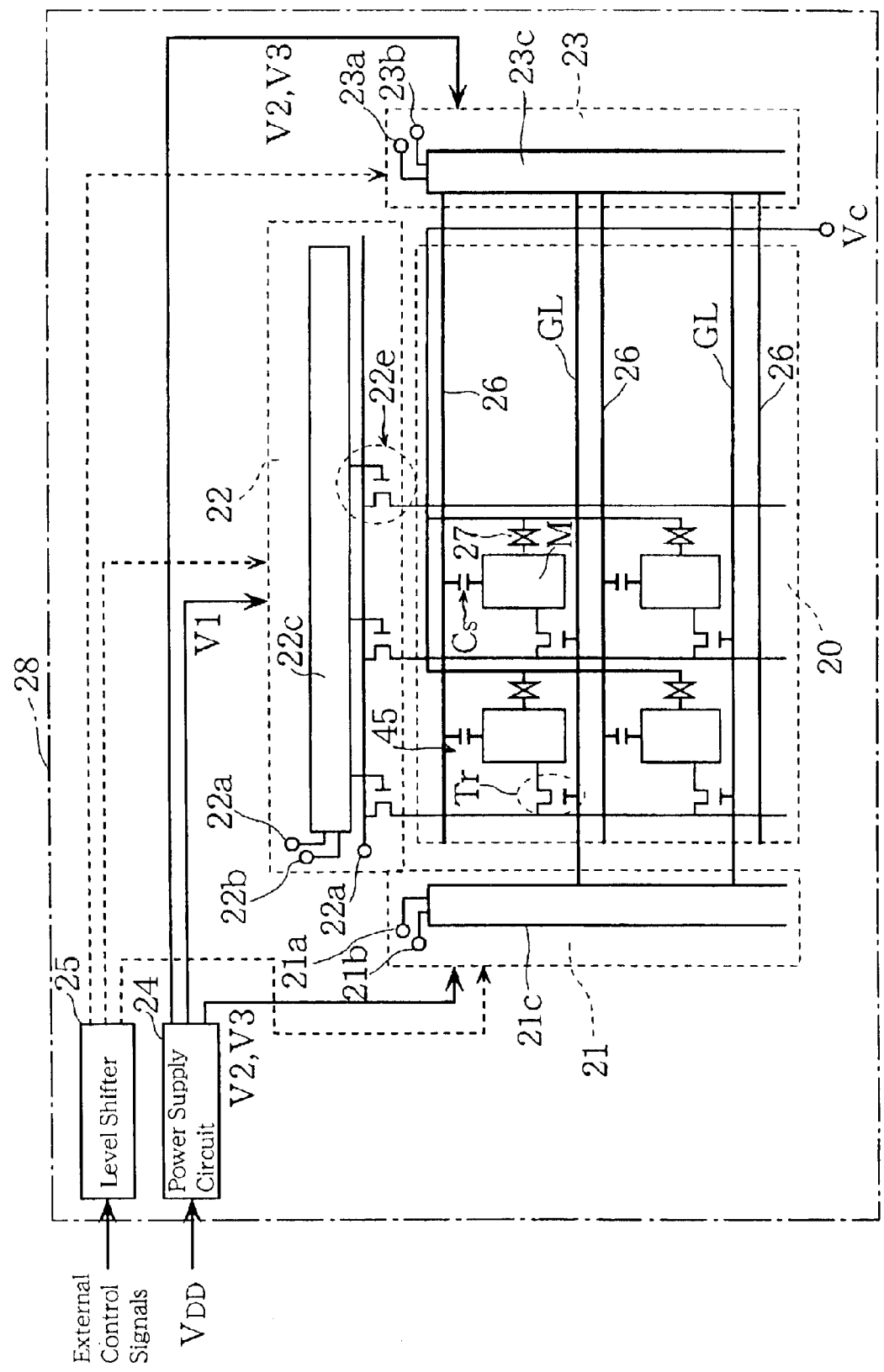
FIG. 2 is a diagram showing the entire configuration of a liquid crystal display device according to embodiment 1.

FIG. 2 is a circuit diagram of the liquid crystal display device 12. The liquid crystal display device 12 is an active matrix-type liquid crystal display device that employs a system of capacitively coupled driving. The liquid crystal display device 12 includes a liquid crystal display portion 20, a gate driver circuit 21 for supplying scan signals to gate lines SL, a source driver circuit 22 for supplying image signals to source lines GL, a compensation voltage-applying driver circuit 23 that supplies compensation voltages to compensation voltage-applying source wiring 26, a power supply circuit 24 for supplying power supply voltages for driving to each of the driver circuits 21, 22, and 23, and a level shifter circuit 25 for converting low amplitude control signals supplied from an external source into high amplitude control signals that may be used in each of the driver circuits 21, 22, and 23 and supplying these signals to the driver circuits 21, 22, and 23. The liquid crystal display portion 20 includes a plurality of gate lines GL and a plurality of source lines S arranged in a matrix and includes unit pixels 45 arranged in a matrix. Each unit pixel 45 includes a pixel electrode M, a pixel switching element Tr connected to the pixel electrode M, and a voltage controlling capacitor Cs for carrying out capacitively coupled driving. One of the electrodes of the voltage controlling capacitor Cs is connected to the pixel electrode M and the other of the electrodes is connected to the compensation voltage-applying source wiring 26. The pixel switching elements Tr are thin film transistors (TFTs) made of a polycrystalline silicon semiconductor.

In the gate driver circuit 21, reference numeral 21a denotes a transfer clock input terminal, reference numeral 21b denotes a start pulse input terminal, and reference numeral 21c denotes a shift register. In the compensation voltage-applying driver circuit 23, reference numeral 23a denotes a transfer clock input terminal, reference numeral 23b denotes a start pulse input terminal, and reference numeral 23c denotes a shift register. In the source driver circuit 22, reference numeral 22a denotes a transfer clock input terminal, reference numeral 22b denotes a start pulse input terminal, reference numeral 22c denotes a shift register, reference numeral 22d denotes an image signal input terminal, and reference numeral 22e denotes a transfer gate element.

Reference character Vc denotes the potential of a counter electrode formed on a counter substrate, reference numeral 28 denotes an active substrate made of glass, reference numeral 27 denotes a liquid crystal layer held between the active substrate 28 and the counter substrate.

According to the present embodiment 1, the power supply circuit 24, the gate driver circuit 21, the compensation voltage-applying driver circuit 23, the source driver circuit 22, and the level shifter circuit 25 are all made of a polycrystalline silicon semiconductor and together make up a built-in circuit that is integrally formed with the active substrate 28 during the production process of the pixel switching elements Tr.

Figure 3:
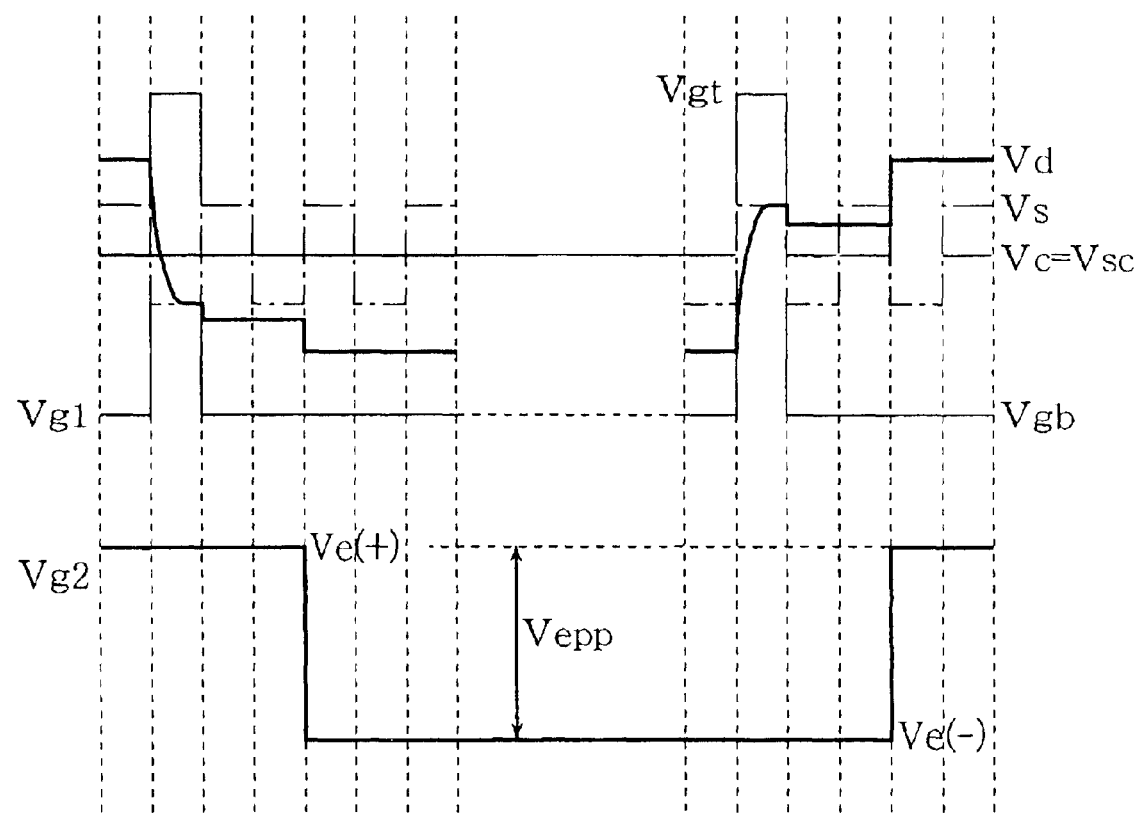
FIG. 3 is a driving waveform diagram of the liquid crystal display device according to embodiment 1.

FIG. 3 shows a driving waveform diagram of a driving method of this liquid crystal display device. In FIG. 3, reference characters Vg1 and Vg2 denote a first and a second scan signal, respectively, reference character Vs an image signal, reference character Vd a pixel electrode potential, and reference character Vc a counter electrode potential. The scan signal Vg1 comprises a potential (Vgt) for turning on and a potential (Vgb) for turning off the switching element 4. The compensation voltage signal Vg2 comprises two values for bias potential (Ve(+), Ve(−)). According to the capacitively coupled driving method, the counter electrode is fixed and by applying an offset voltage to the source electrode, the potential $\Delta V$ caused by punch-through voltage is compensated. In addition, by employing the capacitively coupled driving method, it is possible to lower the pixel signal voltage and to reduce the power consumption of the source driver circuit 22.

A given pixel switching element TR of the liquid crystal display portion 20 is turned on only during periods when the scan signal Vg1 applied to the gate line GL from the gate driver circuit 21 is an on potential (Vgt). At this time, an image signal Vs transmitted to the source line SL from the source driver circuit 22 is applied to the pixel electrode M via the switching element Tr, which is in an on state. When the scan signal Vg1 changes to an off potential (Vgb) and consequently, the switching element Tr into an off state, the pixel electrode potential Vd is held by the liquid crystal capacitor and the voltage controlling capacitor Cs, but it is shifted in response to the potential of the compensation voltage signal Vg2 supplied from the compensation voltage-applying driver circuit 23 via the voltage controlling capacitor Cs and the compensation voltage-applying source wiring 26. With advancement to the next frame after the portrayal of one screen has been completed, the polarity of the image signal Vs is reversed with respect to a central potential Vsc, and this operation is repeated. In this manner, display by a system of capacitively coupled driving is carried out.

It is noteworthy that the driving voltages of each of the driver circuits 21, 22, 23 in the present embodiment are integral multiples of the reference power supply voltage VDD. In other words, the power supply circuit 24 is a charge pump-type power supply circuit and is configured such that the reference reference power supply voltage VDD is converted into power supply voltages for driving that are integral multiples of VDD and the power supply power supply for driving is supplied to each of the driver circuits 21, 22, and 23.

Figure 4:
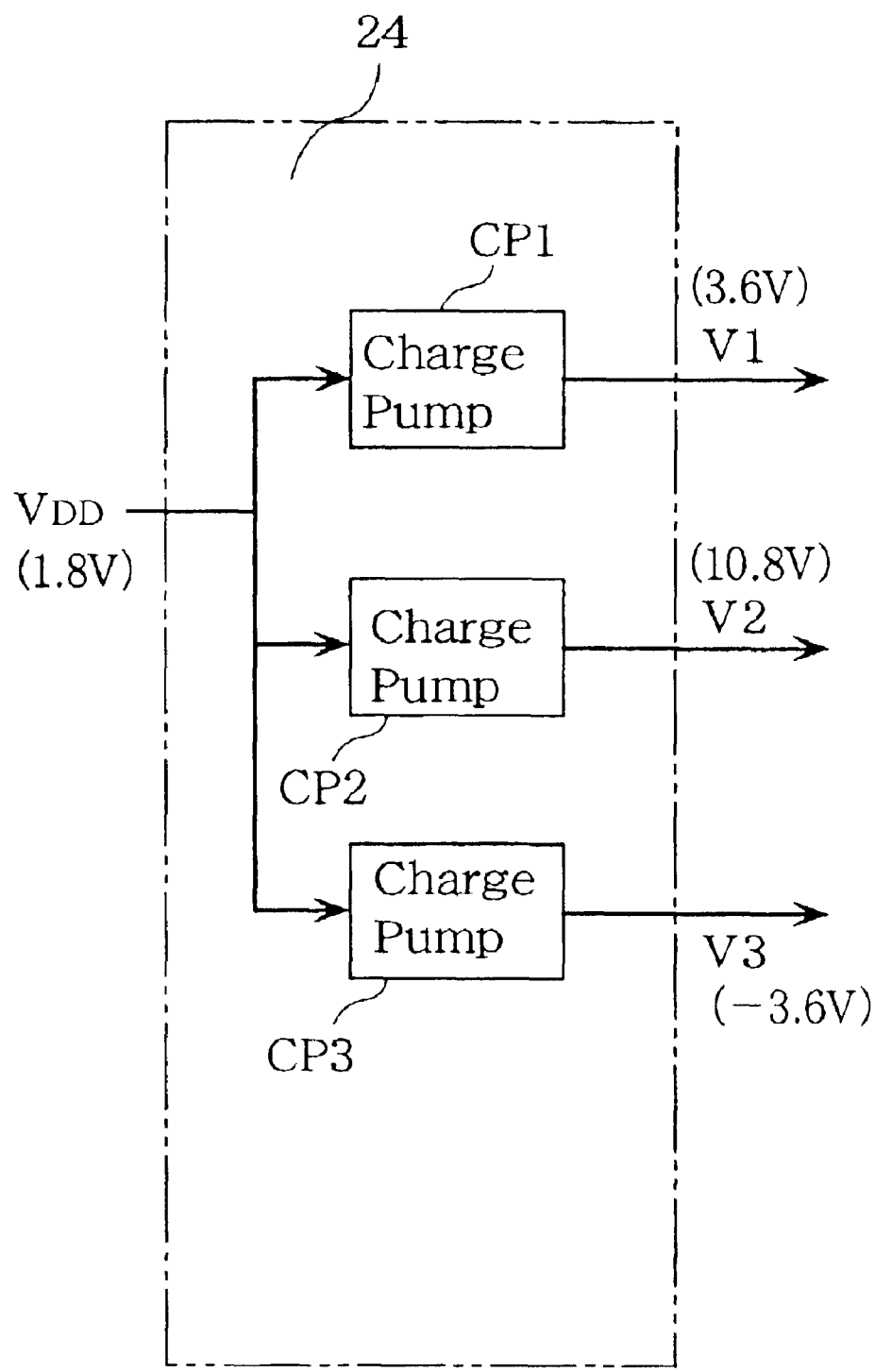
FIG. 4 is a detailed circuit diagram of a charge pump-type power supply circuit.
Figure 5:
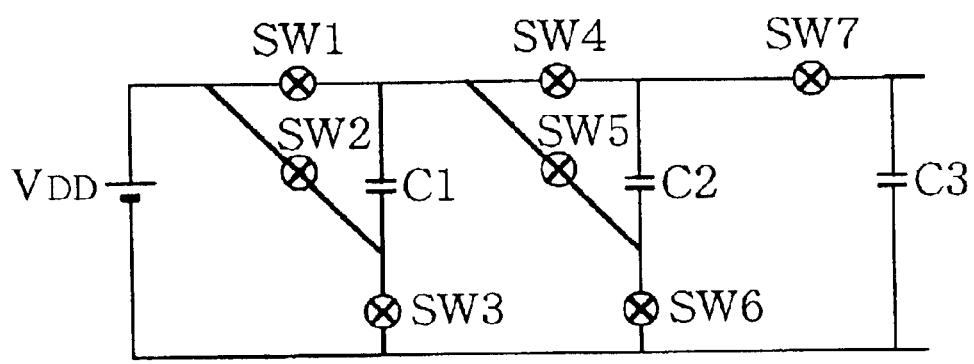
FIG. 5 is a diagram for illustrating the charge pump operation principle of the power supply circuit.

FIG. 4 is a detailed circuit diagram of the charge pump-type power supply circuit 24, and FIG. 5 is a diagram for illustrating the charge pump operation principle of the power supply circuit. According to embodiment 1, the power supply circuit 24 generates three types of driving voltages V1, V2, and V3 from the reference power supply voltage VDD. This power supply circuit 24, as shown in FIG. 4, has three charge pump circuits CP1, CP2, and CP3. The charge pump circuit CP1 is a circuit for stepping up the reference voltage Vin by a factor of 2, the charge pump circuit CP2 is a circuit for stepping up the reference voltage Vin by a factor of 6, and the charge pump CP3 is a circuit for stepping up the reference voltage Vin by a factor of −2. The driving voltage V1, which has been stepped up by a factor of 2 by the charge pump circuit CP1, is supplied to the source driver circuit 22. The driving voltage V2, which has been stepped up by a factor of 6 by the charge pump circuit CP2, is supplied to the gate driver circuit 21 and the compensation voltage-applying driver circuit 23. The driving voltage V3, which has been stepped up by a factor of −2 by the charge pump circuit CP3, is supplied to the gate driver circuit 21 and the compensation voltage-applying driver circuit 23.

With reference to FIG. 5, the stepping up principle of the charge pump circuits is described using the case of stepping up by a factor of 3 as an example. First, by turning on switches SW1 and SW3 and turning off a switch SW2, the reference voltage Vin is applied to a capacitor C1 and the capacitor C1 is charged until the voltage across its terminals is VDD. By then switching on switches SW2, SW4, and SW6 and switching off switches SW1, SW3, and SW5, 2VDD, which is the sum of the charging voltage VDD of the capacitor C1 and the reference voltage VDD, is applied to a capacitor 2, and the capacitor 2 is charged until the voltage across its terminals is 2VDD. By then switching on the switches SW1, SW5, and SW7 and switching off the switches SW2, SW3, SW4, and SW6, 3DD, which is the sum of the charging voltage 2VDD of the capacitor 2 and the reference voltage VDD, is applied to the capacitor 3. Therefore, if the voltage across the terminals of the capacitor 3 is made an output voltage, it is possible to output voltages that are the reference voltage stepped up by a factor of 3. Based on such a principle, the charge pump circuit CP1 steps up the reference voltage VDD by a factor of 2 and the charge pump circuit CP2 steps of the reference voltage VDD by a factor of 6.

Note that according to the present embodiment, the reference voltage VDD=1.8 V, V1=3.6 V, V2=10.8 V, and V3=−3.6V.

By using such a charge pump-type power supply circuit 24, the need for a voltage divider circuit such as that of the prior art example is eliminated, making it possible reduce power loss caused by a voltage divider circuit or the like and thereby, to realize a low power consumption liquid crystal display device with a power supply circuit having excellent voltage conversion efficiency. In addition, by integrally forming the power supply circuit 24 with the substrate 28 as described above, connection defects that arise with an external power supply circuit are eliminated, whereby reliability is improved and a reduction in production costs is realized.

In addition, by using such a power supply circuit 24 in an active matrix-type liquid crystal display device that employs a system of capacitively coupled driving, the value of the voltage controlling capacitors is made an optimum value, and the voltage amplitude of the scan signals is made a minimum voltage amplitude within a range in which the liquid crystal can be driven, thereby further reducing power consumption.

More specifically, it is as follows.

(1) Optimization of Voltage Controlling Capacitance

In the liquid crystal display device according to the present embodiment, voltage controlling capacitance Cs is determined by the following Equation 1.

$$Cs = (Vbias/Vepp) \cdot (Ctot) \quad (1)$$

In this equation, Vepp is the voltage amplitude of the compensation voltage, Vbias is change in pixel voltage caused by change in the compensation voltage, and Ctot is the sum of liquid crystal capacitance Clc, parasitic capacitance Cgd of the transistor, and the voltage controlling capacitance Cs.

Figure 6:
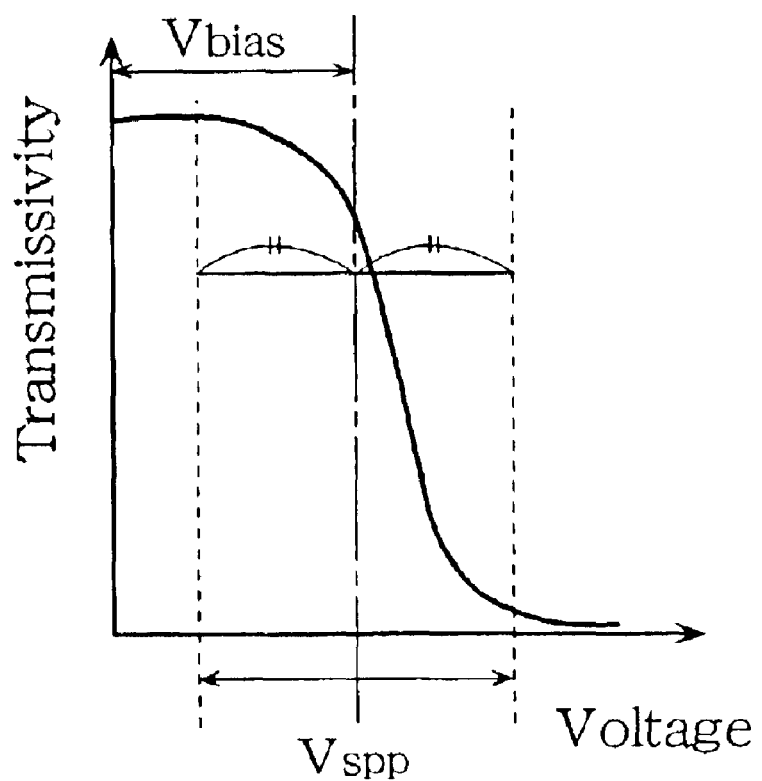
FIG. 6 is a graph showing the range for Vbias.

The power supply of the compensation voltage-applying circuit 23 is converted to integral multiples of the reference power supply voltage VDD, and thus the voltage amplitude Vepp of the compensation voltage (see FIG. 6) is n times the reference power supply voltage VDD, i.e., Vepp=n·VDD (where n is a natural number). Therefore, Equation 1 can be expressed by the equation below.

$$Cs = (Vbias/VDD) \cdot (Ctot) \cdot (1/n) \quad (2)$$

According to the present embodiment, the n of this equation is set so as to be in the range of $1 \leq n \leq 4$. The aperture ratio is thus increased and increase in leak current is suppressed, making it possible to realize a liquid crystal display device with improved display characteristics. The reasons for this are as described below.

First, the introduction of Equation 1 above is discussed. When driving a liquid crystal, in consideration of the minimum liquid crystal driving voltage amplitude Vspp, Vbias is in the range shown in FIG. 6. According to a system of capacitively coupled driving of the present invention, by applying a compensation voltage Vepp from one of the electrodes of the voltage controlling capacitor, the amplitude required for a source line becomes the same amplitude as the liquid crystal driving voltage amplitude (Vspp). Therefore, Vbias is such that Vbias=(Cs/Ctot)·Vepp. This equation is rearranged to derive Equation 1. Accordingly, if Cs is set so as to satisfy Equation 2, which is derived from Equation 1, the liquid crystal is optimally driven.

Figure 7:
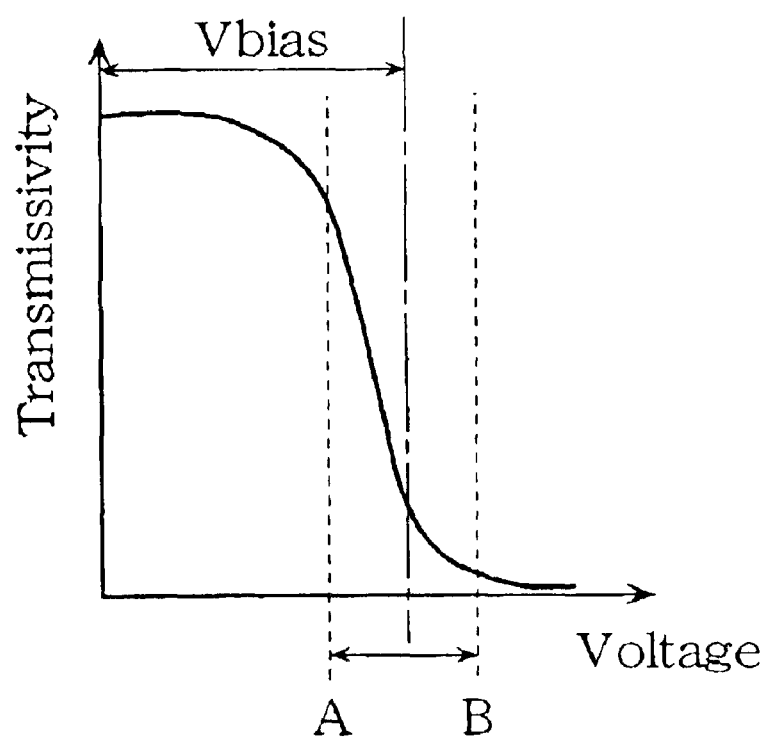
FIG. 7 is a graph showing Vbias shifted to the right side.

However, under the conditions of Equation 2, if n is taken to be an arbitrary value, i.e., Cs is taken to be an arbitrary value, a problem such as the following arises. When Cs is an arbitrary value (equivalent to n being an arbitrary value), Vbias shifts back and forth; for example, when it shifts to the right, voltage oscillates between A and B as is shown in FIG. 7 and as a result, white cannot be displayed. Conversely, when it shifts to the left, black does not sufficiently darken. Thus, optimum contrast is not obtained. Note that FIG. 7 shows the case of normally white mode, and that in the case of normally black mode, a phenomenon opposite to that described above occurs in response to the shift back and forth of Vbias. Although such a problem can be eliminated by increasing the amplitude, as a result, the power consumption increases. In consideration of these problems, in order to obtain sufficient contrast with the lowest possible power consumption and smallest amplitude, the present invention is such that Equation 2 is satisfied and n is set within the range $1 \leq n \leq 4$.

By defining n in this manner, the following positive effects are exhibited. When n is large, Cs is small and the leak current thereby increases. On the other hand, when n is small, Cs is large and the aperture ratio thereby decreases as a result of the increase in the electrode area for the voltage controlling capacitor. Thus, by setting n so as to be within the range $1 \leq n \leq 4$, increase in leak current is suppressed and a liquid crystal display device with a high aperture ratio is realized.

(2) Optimization of Scan Signal Voltage Amplitude Vgpp

The power supply of the gate driver circuit 21 is an integral multiple of the reference power supply voltage VDD, and thus the scan signal voltage amplitude Vgpp is m times the reference power supply voltage VDD, i.e., Vgpp=m·VDD (where m is a natural number). In addition, m is set to a value whereby the voltage amplitude Vgpp is a smallest amplitude value within a voltage range in which writing of image signals to the unit pixels is possible. As a result, the voltage amplitude Vgpp can be made smaller and the power consumption reduced. For example, when VDD=1.8 V, Vepp=n·VDD=2×1.8 and Vgpp=m·VDD=7×1.8.

Figure 8:
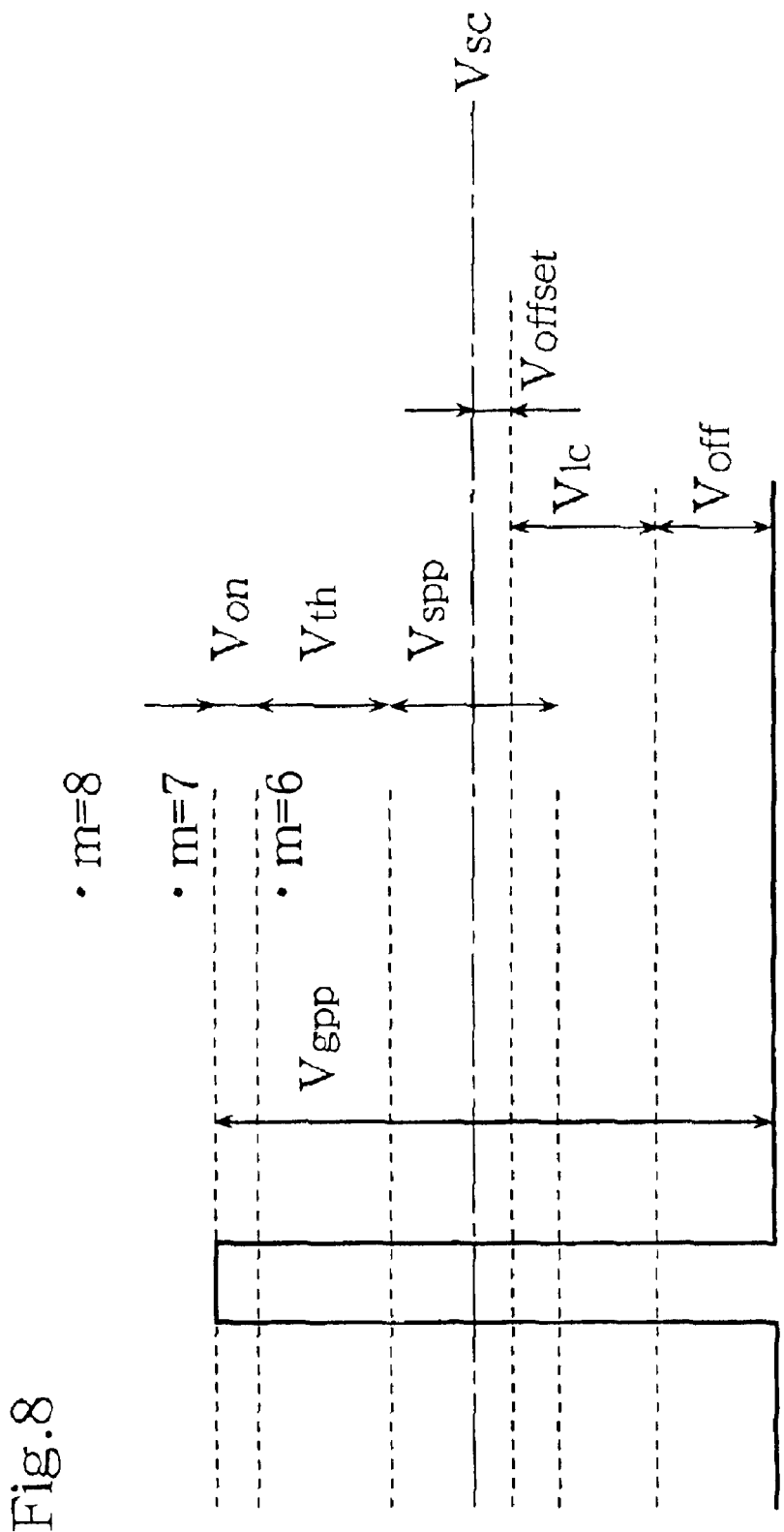
FIG. 8 is a diagram showing the range for scan signal voltage amplitude Vgpp.

Further description is provided with reference to FIG. 8. In FIG. 8, Von denotes the on margin, Voff the off margin, Vth the threshold voltage of the TFT, Vspp the minimum amplitude of the liquid crystal driving voltage, Vlc the on voltage of the liquid crystal, Voffset the offset voltage (the difference between the midpoint of the image signal and the counter voltage), Vsc the signal's midpoint, and Vgpp the scan signal amplitude. For example, when m=6, the threshold voltage Vth is not reached and consequently, the liquid crystal display cannot be switched into the on state. On the other hand, when m=8, the liquid crystal display can be switched into the on state, but this is not suitable from the perspective of power consumption. In order that the liquid crystal be driven by a minimum voltage amplitude, it has been determined that it is necessary that m=7.

In this manner, the driving is carried out with the scan signal voltage amplitude Vgpp at a minimum amplitude, making it possible to realize a reduction in power consumption.

Thus, with the present invention, optimization of voltage controlling capacitance and optimization of both voltage amplitude Vepp of the compensation voltage and scan signal voltage amplitude Vgpp are realized, whereby it is possible to drive the liquid crystal at a minimum voltage amplitude while maintaining the display quality of the liquid crystal and to realize a significant reduction in power consumption.

Image data that is supplied to the liquid crystal display device may be analog signal or digital signal. When input image data is digital signal, it is desirable to provide the source driver circuit 22 with a digital/analog converter circuit.

Alternatively, in cases of not employing a digital/analog converter circuit, digital driving such that unaltered digital signals are supplied to the source lines SL is possible by employing a PWM (pulse width modulation) system of driving (see, for example, Japanese Unexamined Patent Publication No. 5-107561) where gray scale display is carried out by the cumulative effect of hold times when each frame is made up of a plurality of sub-frames that each have a write time and a hold time.

Embodiment 2

Figure 9:
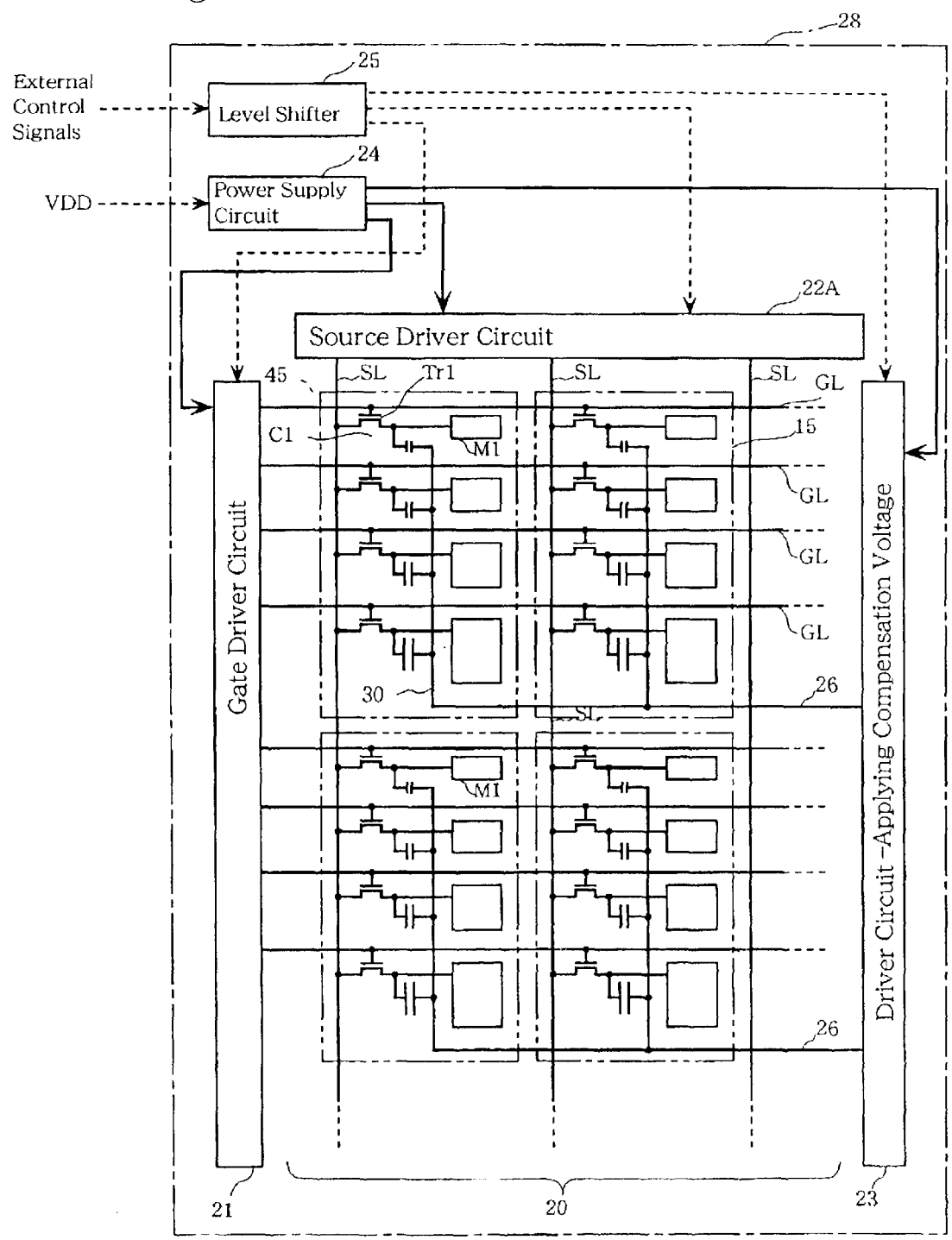
FIG. 9 is a diagram showing the entire configuration of a liquid crystal display device according to embodiment 2.
Figure 10:
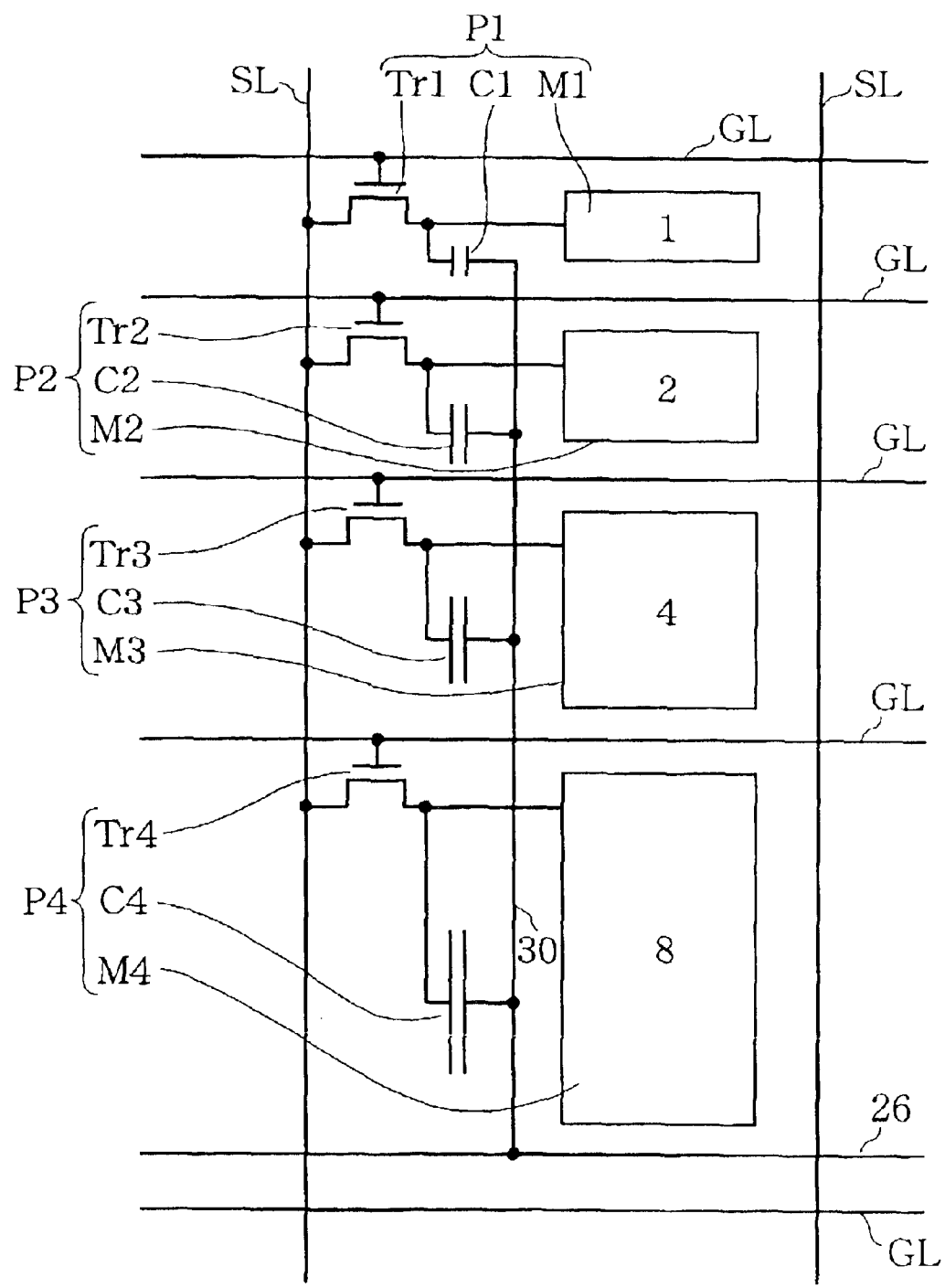
FIG. 10 is a circuit diagram showing the configuration of a unit pixel of the liquid crystal display device according to embodiment 2.

FIG. 9 is a circuit diagram of a liquid crystal display device according to the present embodiment 2. FIG. 10 is a circuit diagram showing the configuration of a unit pixel. The liquid crystal display device of embodiment 2 is similar to that of embodiment 1 described above, and thus like numerals are accorded to corresponding parts. Embodiment 2 is characterized by the use of a system of spatial dithering. Note that digital image signals used in embodiment 2 are 4-bit data signals, which is indicative of an active matrix-type liquid crystal display device that can display 16 gray scales.

The liquid crystal display device according to the present embodiment 2 employs a system of spatial dithering and thus each of unit pixels 45 is made up of a plurality (in the present embodiment 1, four) of sub-pixels P1, P2, P3, and P4. The sub-pixel P1 has a sub-pixel electrode M1, a sub-pixel transistor Tr1 that is a thin film transistor (TFT), and a voltage controlling capacitor C1 for carrying out capacitively coupled driving. The other sub-pixels P2–P4, similarly to the sub-pixel P1, are made up of sub-pixel electrodes M2–M4, sub-pixel transistors Tr2–Tr4, and voltage controlling capacitors C2–C4, respectively.

According to the present embodiment 2, the electrode area ratio of the sub-pixels M1–M4 is such that the sizes of the sub-pixels correspond to the weightings of the digital image signals. Specifically, the area of the sub-pixel electrode M1: the area of the sub-pixel electrode M2: the area of the sub-pixel electrode M3: the area of the sub-pixel electrode M4=1:2:4:8. In addition, the first bit of the 4-bit data corresponds to the sub-pixel P1, the second bit to the sub-pixel P2, the third bit to the sub-pixel P3, and the fourth bit to the sub-pixel P4. Because such sub-pixel electrodes have sizes corresponding to weightings of the digital signals, in accordance with the digital image data, display with 16 gray scales is made possible. It is to be noted the electrode area of a sub-pixel electrode means that area of the pixel electrode that effectively contributes to light modulation. For example, in a transmissive type device, the electrode area is an effective area that is obtained by subtracting the area of portions covered by a light-shielding member.

Each of the unit pixels 45 has a wiring configuration such that gate lines GL are individually wired to the respective sub-pixels and a source line SL is commonly wired to all of the sub-pixels. The wiring configuration for the sub-pixels, however, is not limited to the wiring configuration described above, a wiring configuration such that source lines SL are wired to the respective sub-pixels and a gate line GL is commonly wired to all of the sub-pixels also being possible. Specifically, when such a wiring configuration is applied to a wiring configuration of R, G, and B sub-pixels in a liquid crystal display device having full color display, the number of connecting wires increases, possibly inviting an increase in connection defects resulting from the considerable increase in connecting pins and the occurrence of degradation in image quality including display defects. With regard to this point, when the wiring configuration of the present invention is employed, the number of connecting wires does not increase significantly even if applied to a wiring configuration of R, G, and B sub-pixels in a liquid crystal display device having full color display, and thus the problems described above are overcome.

In a liquid crystal display device according to embodiment 2, a system of capacitively coupled driving (where the potential of the counter electrode is constant) is used in the same manner as in embodiment 1. Specifically, the configuration is such that voltage controlling capacitor wiring 26 is connected to the respective unit pixels 45, and one electrode of each of the voltage controlling capacitors C1–C4 is connected to the voltage controlling capacitor wiring 26 via a common connecting line 30 that is connected to the voltage controlling capacitor wiring 26. It is thus possible to prevent degradation in image quality caused by punch-through voltage. In addition, by providing such independent voltage controlling capacitor wiring 26, the voltage in the gate driver circuit 21 can be reduced more than is possible in the case of superimposing scan signals and compensation signals on one another in the gate lines (for example, Japanese Unexamined Patent Publication No. 2-157815).

Figure 14:
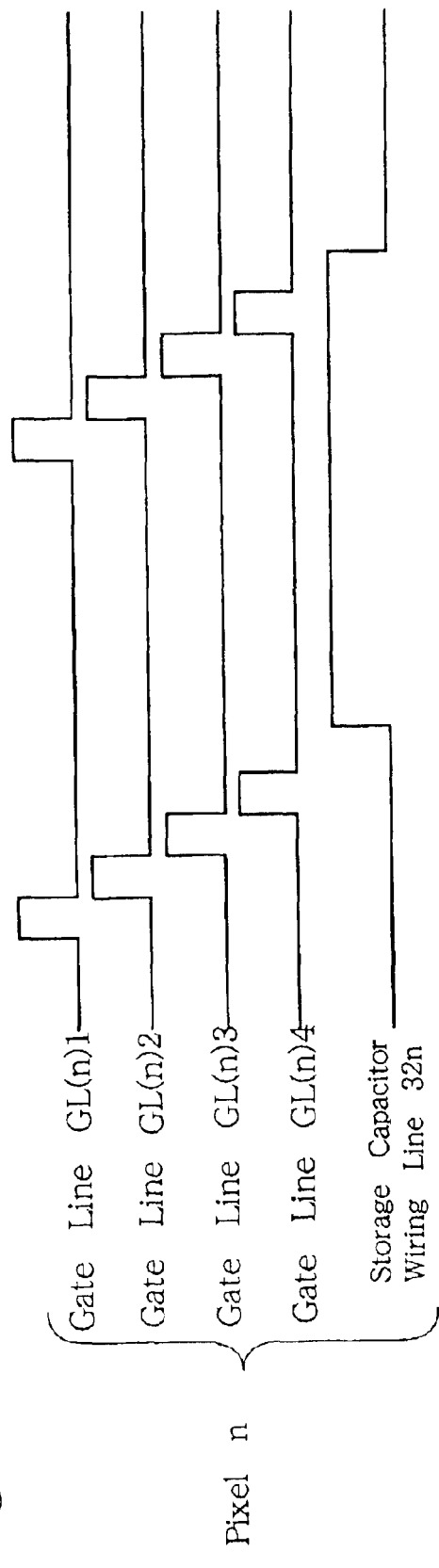
FIGS. 14(a) and 14(b) are timing charts of the displacement of pixel electrode potentials in the liquid crystal display device according to embodiment 2.
Figure 14:
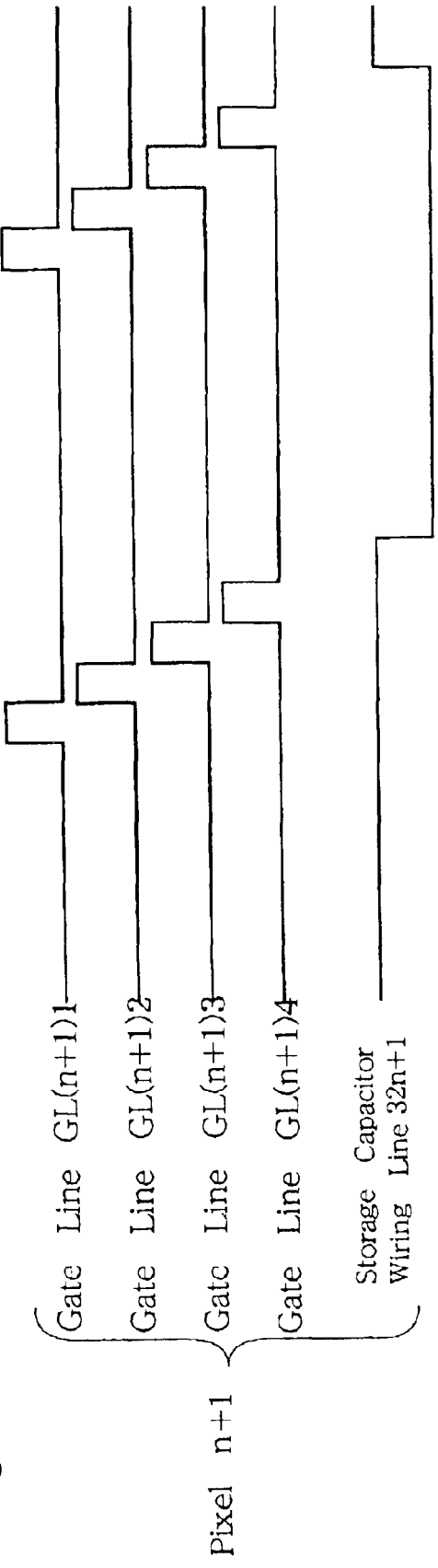

As will be discussed later, the compensation voltage-applying driver circuit is configured so that, as shown in FIG. 14, a compensation voltage signal is altered after completion of writing to all of the sub-pixels that make up a unit pixel and the potential of the pixel electrode of each of the sub-pixels are modulated all at the same time. Thus, in comparison to a configuration such that the voltage controlling capacitor wiring 26 is connected to every sub-pixel and voltage controlling capacitors C1–C4 are independently connected to the voltage capacitor wiring 26, operation is realized with a fewer number of wiring lines for the voltage controlling capacitor wiring 26, and consequently, improvement in aperture ratio and simplification in driving control is achieved. Furthermore, 1 horizontal scanning frequency (here, 1 horizontal scan denotes the altering of compensation voltage and the modulating of the potential of sub-pixel electrodes after completion of writing to the sub-pixels, in a system of capacitively coupled driving such as that of the present embodiment) decreases, whereby a reduction in power consumption is realized. In a driving method that utilizes a system of capacitively coupled driving such as that of the present embodiment, when inversion driving is performed every sub-pixel, gray scale characteristic (y characteristic) is represented by a non-linear shape that is wave-like, rather than a linear shape because of the capacitive coupling. This invites a degradation in display quality. With regard to this point, by performing, as is the case in the present embodiment, inversion driving every unit pixel (if one sub-pixel is taken to be the usual single pixel, this is equivalent to 4H inversion driving), it is possible to improve the linearity of y characteristics and to realize an improvement in display quality.

Note that, in place of the compensation voltage-applying driver circuit 23, it is possible to provide the gate driver circuit 21 with compensation voltage application functions and to connect the voltage controlling capacitor wiring 26 to the gate driver circuit, and by doing this, it is possible to reduce the circuit area for only the portion corresponding to the compensation voltage-applying driver circuit 23.

In this case, the area ratio of the sub-pixel electrodes is 1:2:4:8, and the voltage controlling capacitors are configured so as to have capacitance values that correspond to the area ratio. In other words, the value for voltage controlling capacitor C1: the value for voltage controlling capacitor C2: the value for voltage controlling capacitor C1: the value for voltage controlling capacitor C4=1:2:4:8. It is thus possible to suppress fluctuation in the pixel electrode potentials, making it possible to obtain good image quality.

In addition, each of the sub-pixel transistors Tr1–Tr4 have ON current efficiencies that are set to correspond with the weightings of the digital image signals. Specifically, according to the present embodiment, the channel width of each of the sub-pixel transistors Tr1–Tr4 correspond to the sizes of the electrodes of the sub-pixels, i.e., to the ratio of channel widths is 1:2:4:8. By such a configuration, appropriate writing is possible. It is also possible to, instead of varying the channel width of each of the sub-pixel transistors Tr1–Tr4, to set the channel length so as to correspond with the weightings of the digital image signals. Alternatively, it is possible to vary both channel width and channel length to obtain ON current efficiencies that correspond to the weightings of the digital image signals.

Figure 11:
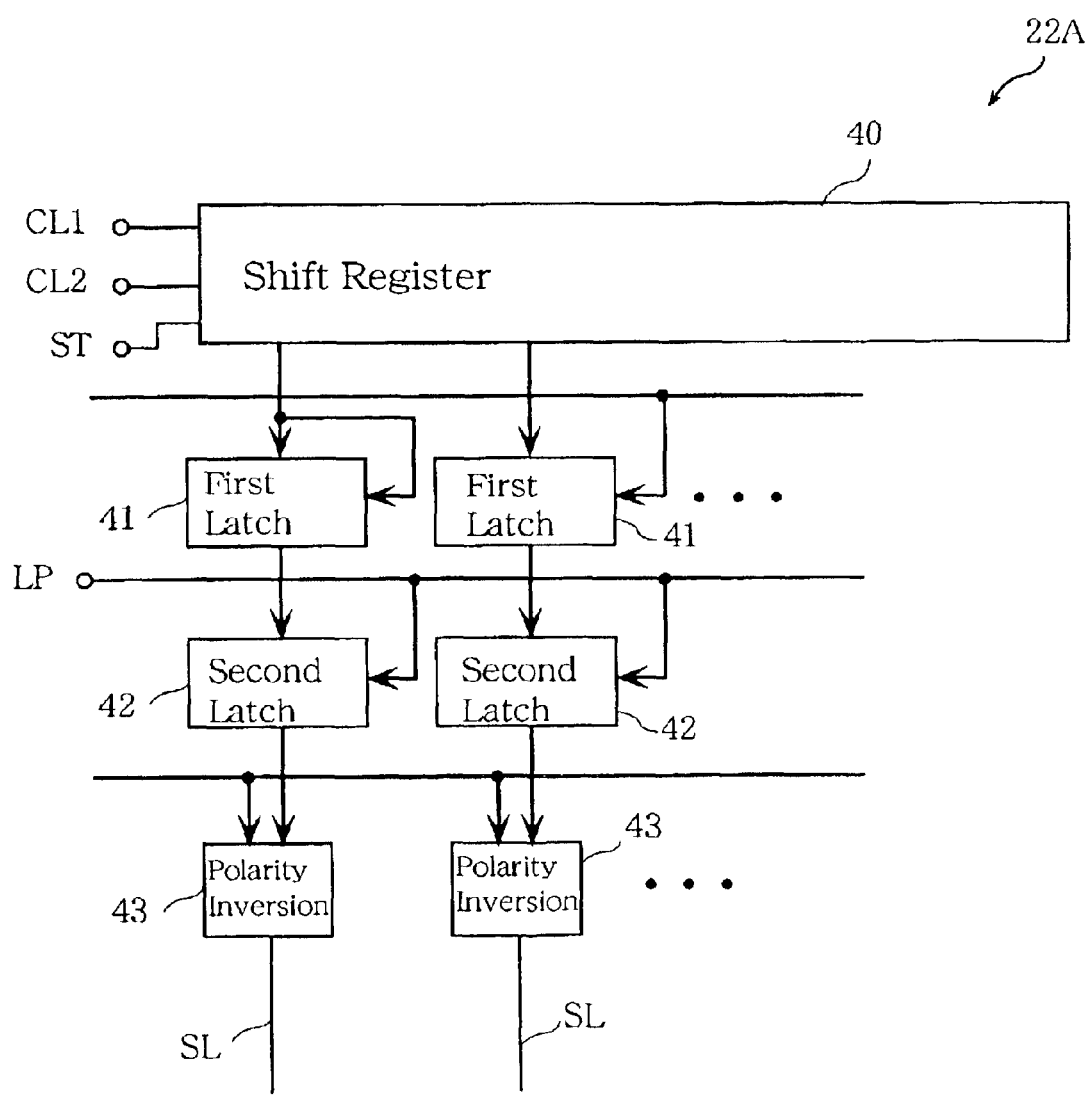
FIG. 11 is a block circuit diagram showing the detail configuration of a source driver circuit of the liquid crystal display device according to embodiment 2.

FIG. 11 is a block circuit diagram showing the specific configuration of a source driver circuit. A source driver circuit 22A according to the present embodiment 2 includes a shift register 40, first latch circuits 41 for latching digital image signals, second latch circuits 42 for latching outputs from the first latch circuits, and polarity inversion circuits 43 by which, for example, EX-OR is realized. In the same manner as the source driver circuit 22 of embodiment 1 above, the source driver circuit 22A is made of polycrystalline silicon semiconductor and is a built-in circuit that is integrally formed with the active substrate 28 during the production process of the sub-pixel transistors T1–T4.

Figure 12:
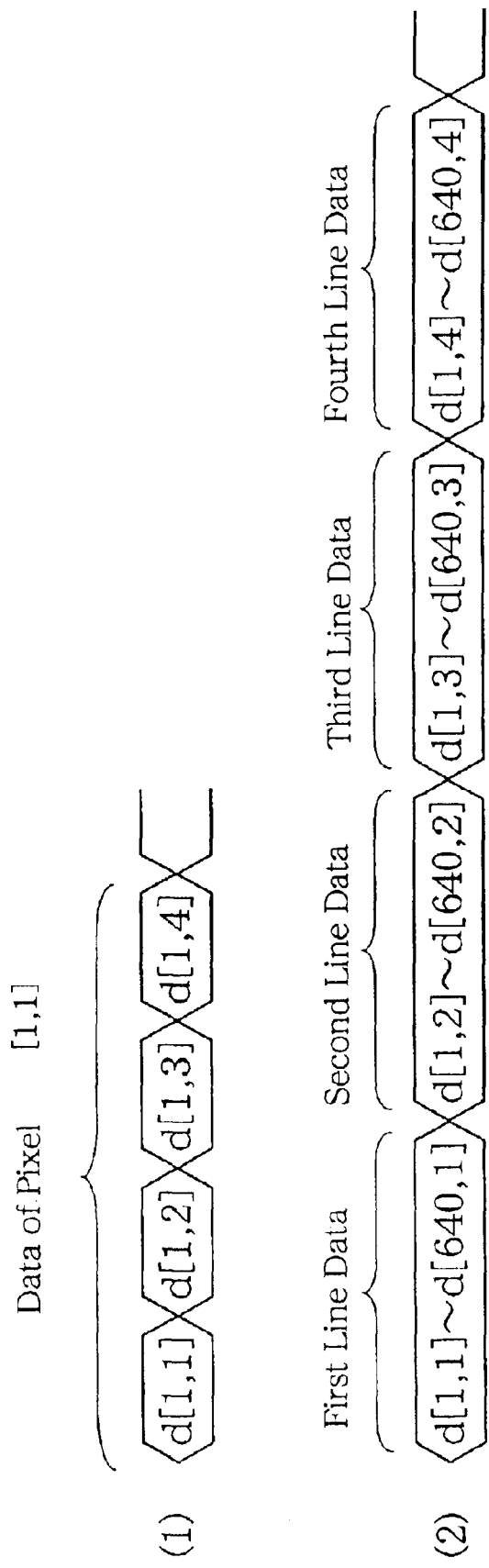
FIG. 12 is a diagram showing data strings of image data of the liquid crystal display device according to embodiment 2.
Figure 13:
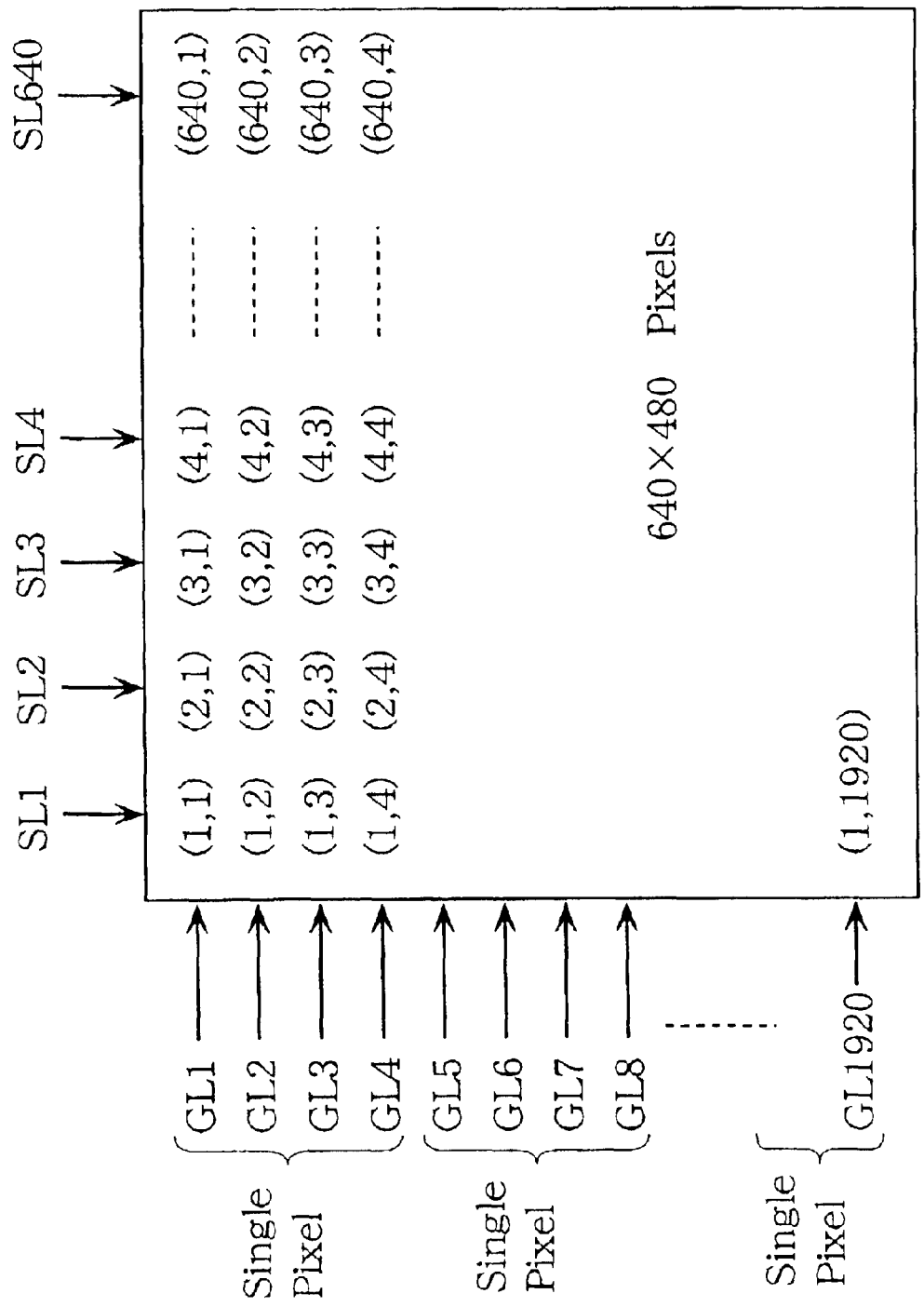
FIG. 13 is a diagram that schematically shows the arrangement of sub-pixels of the liquid crystal display device according to embodiment 2.

FIG. 12 is a diagram showing data strings of image data, FIG. 13 is a diagram schematically showing the arrangement of sub-pixels, and FIGS. 14(a) and 14(b) are timing charts of the displacement of pixel electrode potentials. FIG. 5 shows sub-pixels of an i-th source line SLi and a j-th gate line GLj. As an example, the configuration of a VGA (640×480) liquid crystal panel is shown. It is of course the case that the sub-pixels have areas that correspond to the weightings of the digital signals, and the arrangement of FIG. 13 in which sub-pixels appear to be the same size differs from the actual arrangement. However, for the purpose of illustrating display operation, it is sufficient only to specify which sub-pixels of all of the sub-pixels are connected to which source line SL and gate line GL, and thus, the schematic diagram of FIG. 13 is used. FIG. 14(a) shows the timing related to pixels of the n-th row, and FIG. 14(b) shows the timing related to pixels of the n+1-th row.

First, an image signal is converted by an external data conversion circuit (not shown in figure) from original image data as shown in FIG. 12(1) to an image data string as shown in FIG. 12(2). Specifically, the image data shown in FIG. 12(2) is supplied to an input data line of the first latch circuit 41. In FIG. 12(2), bit data d (i, j) is data for sub-pixels relating to the i-th source line SLi and the j-th gate line GLj. As is clear from FIGS. 12(1) and 12(2), a single pixel shows 4-bit data, and this 4-bit data is allotted to a single line data of four consecutive rows. For example, in the case of a pixel [1,1] made up of a sub-pixel (1, 1), a sub-pixel (1, 2), a sub-pixel (1, 3), and a sub-pixel (1, 4), bit data d (1, 1) of the sub-pixel (1, 1) is allotted to a first line data string, bit data d (1, 2) of the sub-pixel (1, 2) is allotted to a second line data string, bit data d (1, 3) of the sub-pixel (1, 3) is allotted to a third line data string, and bit data d (1, 4) of the sub-pixel (1, 4) is allotted to a fourth line data string, and these bit data are the first bit data of each of the first to fourth line data strings. Such allotment of 4-bit image data for a unit pixel is also carried out for the other unit pixels.

First, once the image data as shown by FIG. 12(2) is supplied to an input data line, latch pulses are sequentially outputted from the shift register 40 in synchronization with the image data. Thus, bit data of the first line data are sequentially latched by the first latch circuits 41. After bit data of the single line data have been latched by the first latch circuits 41, the latch pulses are commonly supplied to the second latch circuits 42. Thus, line data from the first latch circuits 41 is latched by the second latch circuits 42 and is supplied to the liquid crystal display portion 20 via the source lines SL. In synchronization with this, a first gate line GL1 is selected, whereby the first line data is written to each sub-pixel electrode connected to the first gate line GL1. Subsequently, according to the same operation, the second line data, the third line data, and the fourth line data are written. After writing of the fourth line data has been completed (i.e., after completion of writing to the unit pixels of the first line), the compensation voltage is then shifted to the high potential side via the voltage controlling capacitor wiring 26, as shown in FIG. 14(a). Thus, the pixel electrode potentials of the unit pixels of the first line are modulated to predetermined potentials, whereby the potentials applied to the pixel electrodes of the first line have a positive polarity with respect to the counter electrode potential Vc.

In pixel [1, 1] during this process, the bit data d (1, 1) is written to the sub-pixel (1, 1) by the writing of the first line. Likewise, the bit data d (1, 2) is written to the sub-pixel (1, 2), the bit data d (1, 3) to the sub-pixel (1, 3), and the bit data (1, 4) to the sub-pixel (1, 4) by the writing of the second to the fourth lines. Subsequently, by shifting the compensation voltage to the high potential side, modulation to sub-pixel electrode potentials that correspond to the bit data d (1, 1)—the bit data d (1, 4) occurs, whereby the pixel [1, 1] displays a predetermined gray scale.

For example, when the bit data d (1, 1)="1," the bit data d (1, 2)="0," the bit data d (1, 3)="0," and the bit data d (1, 4)="0," only the sub-pixel (1, 1) is on, the other sub-pixels, sub-pixel (1, 2), sub-pixel (1, 3), and sub-pixel (1, 4), being off. Thus, the pixel [1,1] displays a brightness of level 1 of the 16 gray scales. In addition, for example, when the bit data d (1, 1)="1," the bit data d (1, 2)="1," the bit data d (1, 3)="0," and the bit data d (1, 4)="0," the sub-pixel (1, 1) and the sub-pixel (1, 2) are on, and the sub-pixel (1, 3) and the sub-pixel (1, 4) are off. Thus, the pixel [1, 1] displays a brightness of level 3 of the 16 gray scales.

In the example above, the pixel [1, 1] was described, but the same display operation is carried out for the other pixels, such that brightness of a predetermined gray scale level is displayed. In this manner, gray scale display is carried out in response to video signal.

Subsequently, writings of the fifth to the eighth line data, i.e., writing to the unit pixel of a second line, are carried out. Writings of the fifth to the eighth line data are substantially the same as the writing operations for the first to the fourth line data described above. Specifically, after writings of the fifth to the eighth line data have been completed (i.e., after the writing of the pixel of the second line has been completed), the compensation voltage is shifted to the low potential side via the voltage controlling capacitor wiring 26, as is shown in FIG. 14(b). Thus, the pixel electrode potentials of the unit pixels of the second line are modulated to predetermined potentials, whereby the potentials applied to the unit pixels of the second line have a negative polarity with respect to the counter electrode potential Vc.

For the remaining lines, similar operations are carried out, and thereby, 4H inversion driving where polarity is reversed every four lines is carried out (from the perspective of unit pixels, polarity inversion driving every unit pixel). Prevention of the generation of flicker is thus realized.

Note that, in the example described above, an example of 4-bit (16 gray scales) display was described, but the present invention is not limited to this, it being possible to have unit pixels that are made up of 5, 6 or more sub-pixels to carry out 5-bit (32 gray scales), 6-bit (64 grays scales), or other multi-level gray scale displays.

In addition, according to the example above, a black and white liquid crystal display device was described, but the present invention can also be applied to a liquid crystal display device for full color display having R (red), G (green), and B (blue) sub-pixels. In the case of application to a liquid crystal display device for full color display, configuration may be such that unit pixels 45, 45, and 45 are taken to be RGB sub-pixels so that the unit pixels 45, 45 and 45 constitute a single pixel and unit pixels lined up in the horizontal direction (lateral direction of the liquid crystal display panel) are RGB sub-pixels, respectively.

Embodiment 3

The present embodiment 3 is characterized in that storage capacitors are formed in addition to the voltage controlling capacitors in each of the sub-pixels. According to such a configuration, load capacitance can be increased, and holding characteristics for the pixel electrode potentials improved. In addition, it is possible to realize an improvement in image quality.

In the following, with reference to FIGS. 15 and 16, the present embodiment is described in detail.

Figure 15:
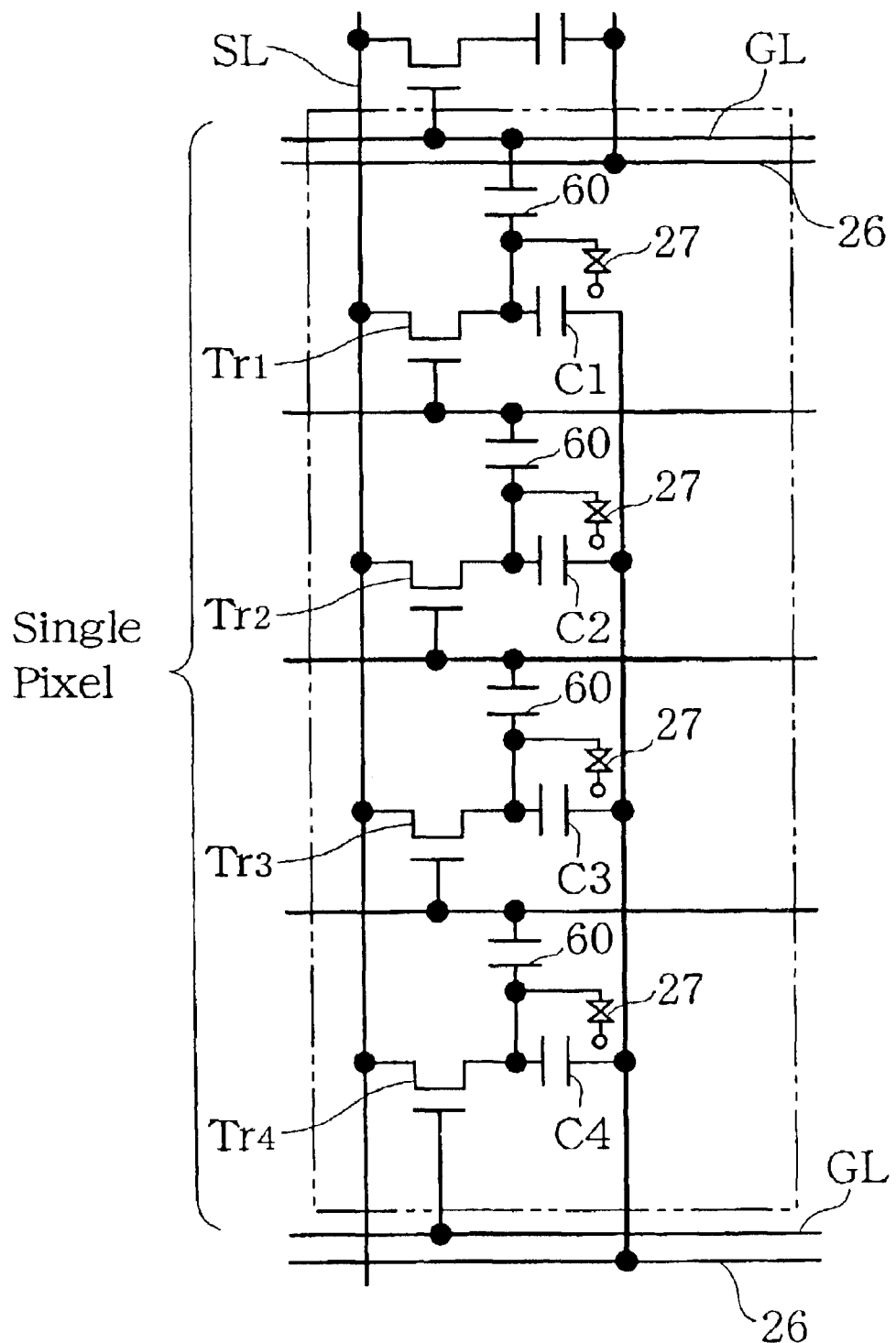
FIG. 15 is a diagram showing the configuration of unit pixels in a liquid crystal display device according to embodiment 3.
Figure 16:
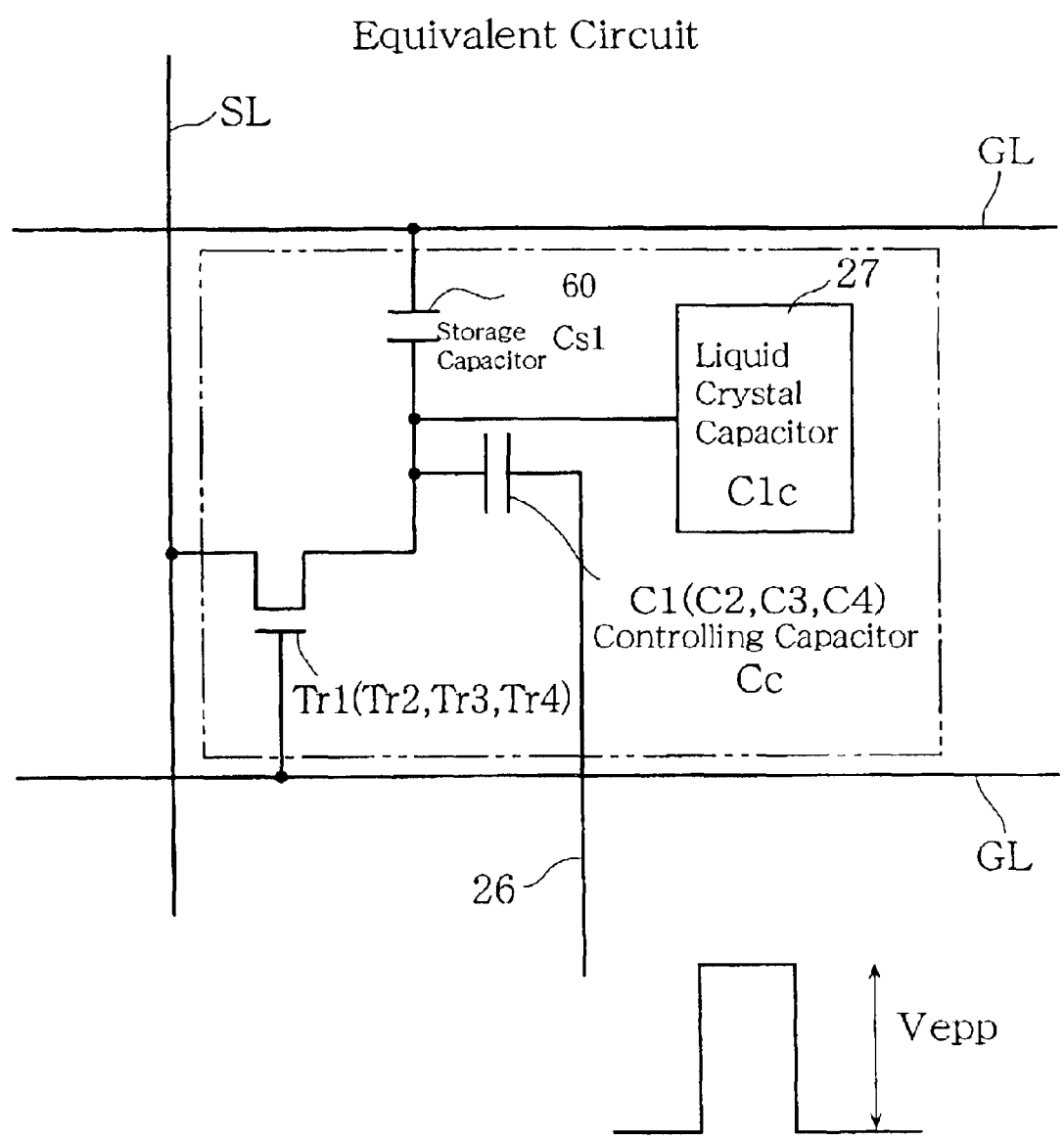
FIG. 16 is an equivalent circuit diagram for one sub-pixel of the liquid crystal display device according to embodiment 3.

FIG. 15 is a diagram showing the configuration of a unit pixel in a liquid crystal display device according to embodiment 3, and FIG. 16 is an equivalent circuit diagram for a sub-pixel thereof. Parts corresponding to those of embodiment 2 are accorded like reference numerals and detailed description is omitted. In a sub-pixel P1 of a liquid crystal display device according to the present embodiment, a storage capacitor 60 is formed between the sub-pixel electrode and the upstream gate line GL, in addition to the voltage controlling capacitor C1. The other sub-pixels P2–P4 have similar configurations to that of the sub-pixel P1. In the following discussion, the capacitance value of the store capacitor 60 is represented as Cs1, the capacitance value of the liquid crystal capacitor 27 as Clc, and the capacitance value of the voltage storage capacitors C1–C4 as Cc.

In conventional configurations for auxiliary capacitors, an auxiliary capacitor has been provided on the voltage controlling capacitor wiring (FIG. 17(a)) or has been provided in the space formed with the upstream gate line (FIG. 17(b)). By contrast, the present embodiment employs a configuration in which an auxiliary capacitor is provided both on the voltage controlling capacitor wiring and in the space formed with the upstream gate line (FIG. 17(c)). This configuration makes it possible to increase the capacitance value added to the liquid crystal capacitance, thereby realizing good holding characteristics.

In particular, with a liquid crystal display device according to the present embodiment in which unit pixels are divided into a plurality of sub-pixels, it is difficult to ensure a sufficient capacitance value with only a voltage controlling capacitor formed in each of the sub-pixels. By employing a configuration in which a storage capacitor is separately formed in addition to such a voltage controlling capacitor, it is possible to ensure a necessary and sufficient capacitance value.

Next, optimum driving conditions for the present embodiment are obtained.

Table 1 shows how optimum driving conditions are obtained in the present embodiment.

TABLE 1

|  | Setting (Necessary Condition) | Explanation |
|---|---|---|
| Compensation voltage: Vepp | 3.6 V | Integral multiple of reference voltage (=1.8 V) |
| Bias voltage: Vb | 1.5 V | Optimum bias voltage as determined by T-V characteristic of liquid crystal |
| Storage capacitance: Cs1 | 0.13 pF | Width of gate electrode line (=6 μm) |
| Liquid crystal load capacitance: Ctot (=Clc + Cs1 + Cc) | ≧0.25 pF | Ensures holding characteristic for liquid crystal cell |

First, preferable conditions for driving a liquid crystal panel are determined. In the present embodiment, the amplitude of a compensation signal Vepp supplied to the voltage controlling capacitor wiring is 3.6 V. It is set at this value since the controller of liquid crystal panels often are driven at a voltage of 1.8 V, and therefore, it is preferable that the voltages of other signals are set to be integral multiples of 1.8 V, in order to obtain greater efficiency in the power supply design. In other words, by making Vepp an integral multiple of a reference voltage applied by an external source, typically a voltage for controlling the controller, it is possible to employ a highly efficient DC/DC converter, typically a charge pump, for the power supply circuit. It is thus possible to reduce the power consumption of the system as a whole.

Figure 18:
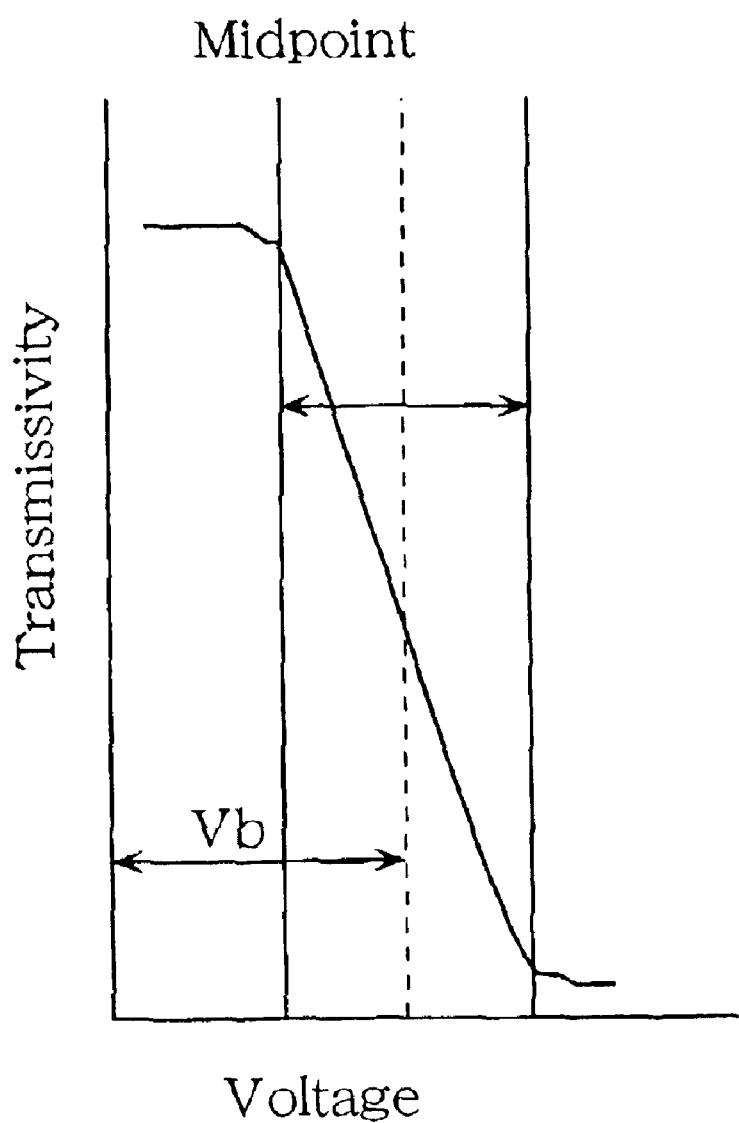
FIG. 18 is a driving waveform diagram of the liquid crystal display device according to embodiment 3.

Next, the value for bias voltage applied to the liquid crystal is determined from the compensation voltage Vepp. This value is governed by the voltage-transmissivity characteristic of the liquid crystal, and as shown in FIG. 18, when this value is set so as to be the exact midpoint of the range over which the transmissivity changes, the amplitude value for the required signal voltage is a minimum value. In the present embodiment, this value was set to 1.5 V.

Next, the value for the storage capacitor formed in the space that is formed with the upstream gate line is determined. This value is governed by the signal line width of the scan electrode. In the present embodiment, the width of the scan electrode is set to 6 μm and the value for the storage capacitor to 0.13 pF.

Next, the value for controlling capacitance Cc is determined using Equation 3 below.

$$Ccc=[(Vbias/Vepp-Vbias)]\cdot(Clc+Csl) \quad (3)$$

In the equation, Vbias is the amount of change in pixel voltage caused by change in the compensation voltage, Vepp is the voltage amplitude of the compensation voltage signal, Cls is the liquid crystal capacitance, and Csl is the storage capacitance.

The value for controlling capacitance is obtained by substituting into Equation 3 the above values and the liquid crystal capacitance Clc that is determined by the size of the pixel electrode. Eventually, the total sum of Clc, Cs, and Cc is designed such that it becomes a capacitance that can obtain satisfactory holding characteristic of the liquid crystal. In the present embodiment, the off resistance of the TFT is taken into consideration and the total sum is designed to be 0.25 pF or greater.

The combinations of the capacitances that satisfy the above-described condition are shown in Table 2.

TABLE 2

| Sub-pixel | Cls<br>Liquid crystal<br>capacitance | Csl<br>Storage<br>capacitance | Cc<br>Voltage<br>controlling<br>capacitance | Ctot<br>Load<br>capacitance |
|---|---|---|---|---|
| M1 | 0.024 | 0.13 | 0.11 | 0.26 |
| M2 | 0.048 | 0.13 | 0.13 | 0.31 |
| M3 | 0.096 | 0.13 | 0.16 | 0.39 |
| M4 | 0.192 | 0.13 | 0.23 | 0.55 |

A liquid crystal display device is fabricated so that the liquid crystal capacitance Clc, the storage capacitance Csl, the voltage controlling capacitance Cc, and the total sum of all the capacitances Ctot are one of the combinations shown in Table 2. It is thereby possible to drive all of the sub-pixels at a same bias voltage and to obtain necessary and sufficient holding characteristic for all of the sub-pixels.

Note that it is preferable to employ polycrystalline silicon thin film transistors for the circuit elements of the gate driver circuit and the source driver circuit of the active substrate and for the pixel switching elements. Reduction in size of transistors in the sub-pixels is thus possible and design is facilitated. Altogether, the building in of driver circuits on the active substrate is facilitated, contributing to a reduction in cost and a reduction in size.

In addition, while a configuration such that each pixel was divided into a plurality of sub-pixels and each of the sub-pixels satisfied the conditions shown in Table 2 was employed in the example above, the method of optimizing the value for the voltage controlling capacitance may be applied to the conventional unit pixel, which is not made up of sub-pixels.

Embodiment 4

Figure 19:
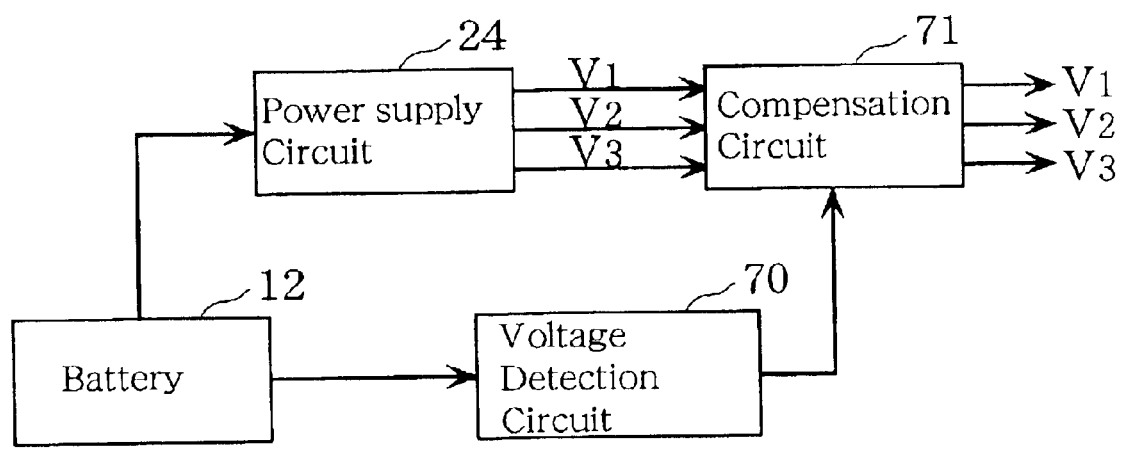
FIG. 19 is a block diagram showing the configuration of a portion of a liquid crystal display device according to embodiment 4.

FIG. 19 is a block diagram showing the configuration of part of a liquid crystal display device of embodiment 4. Reference numeral 70 denotes a voltage detection circuit, reference numeral 71 denotes a compensation circuit for power supply voltages for driving supplied from a power supply circuit 24. The power supply level of a battery 12 is detected by the voltage detection circuit 70 and the detected signal is supplied to the compensation circuit 71. In this manner, the level of the power supply voltage for driving is compensated according to the detection signal. For this reason, even if the power supply voltage of the battery 12 fluctuates, a predetermined power supply voltage for driving can constantly be obtained. Thus, the driver circuits 21, 22, and 23 can be driven at an optimum state without malfunction and a desired liquid crystal display is achieved.

Embodiment 5

Figure 20:
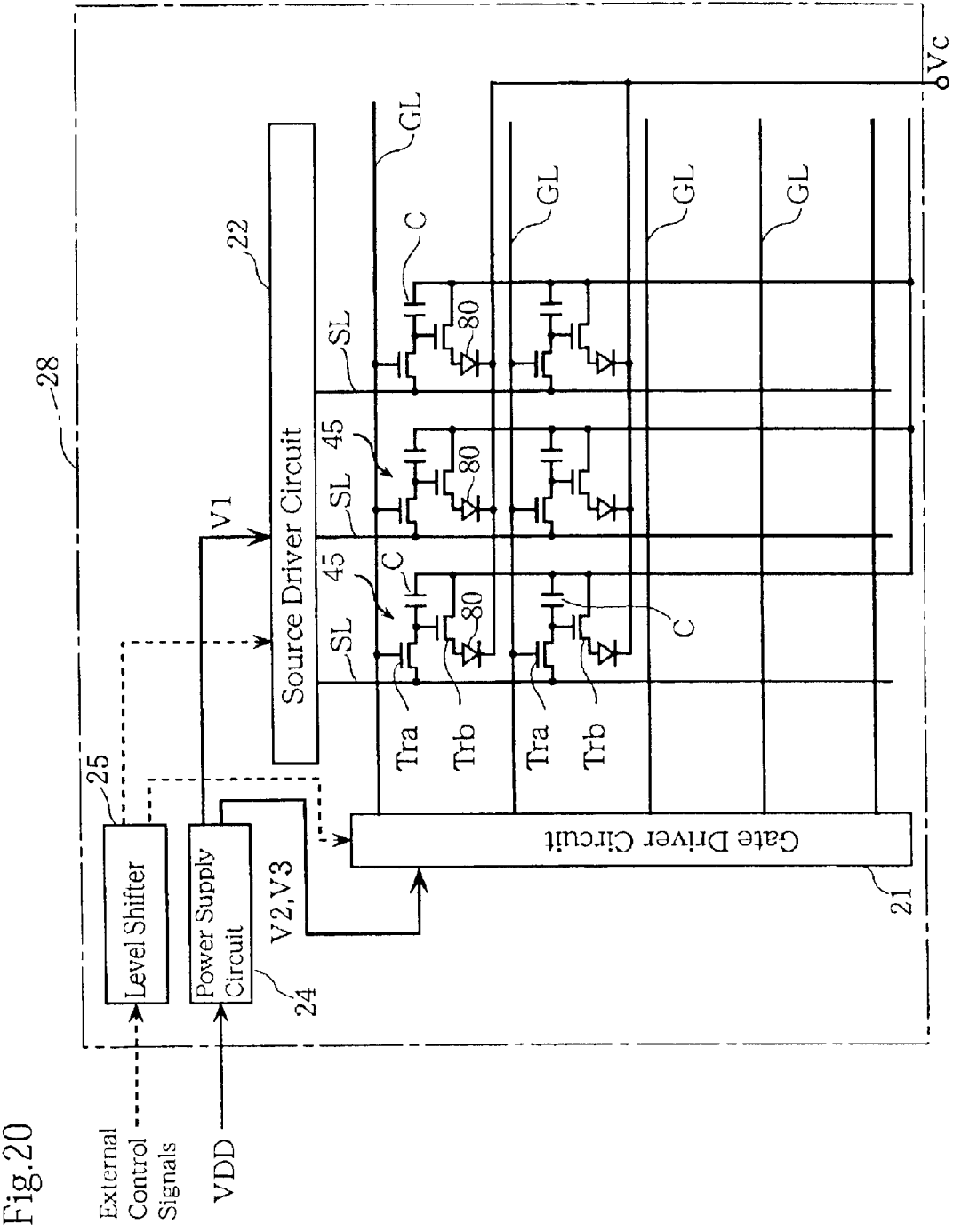
FIG. 20 is a diagram showing the configuration of a liquid crystal display device according to embodiment 5.
Figure 21:
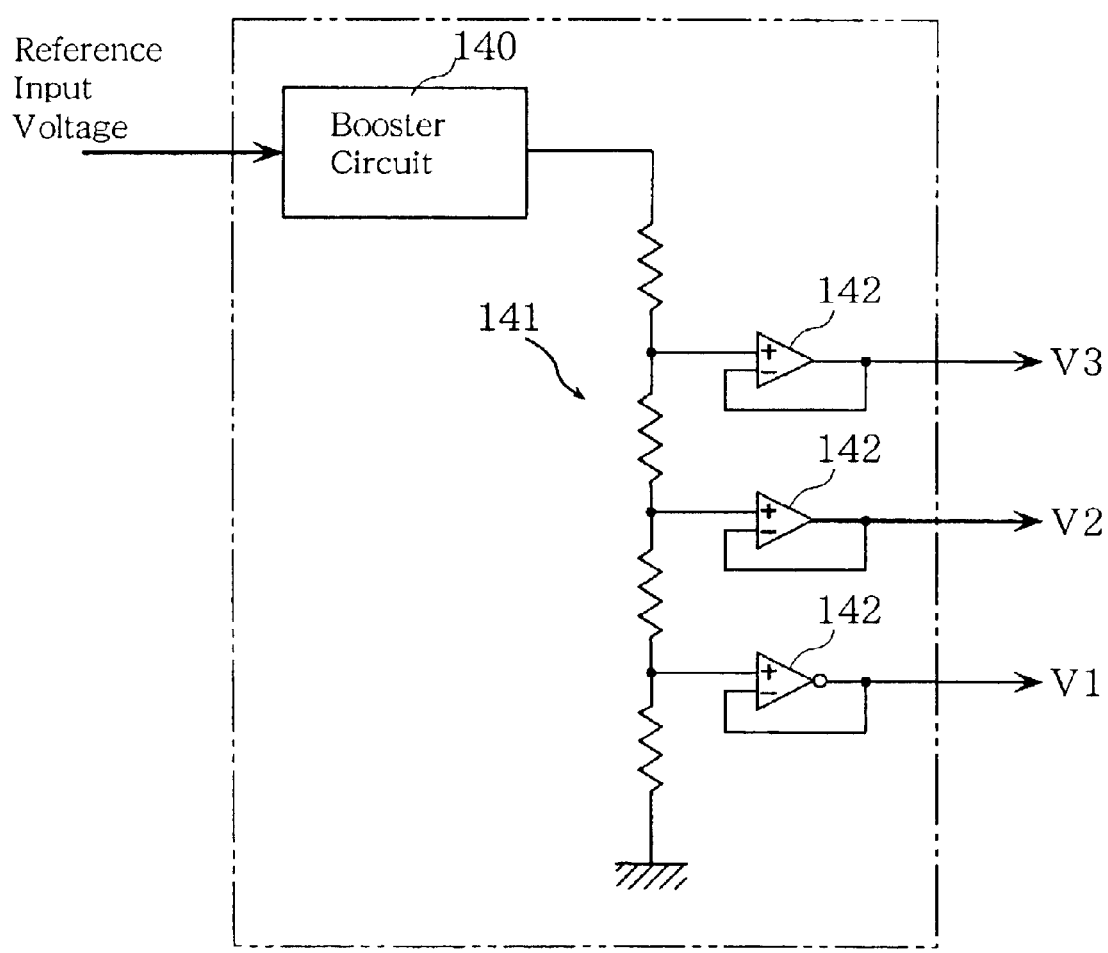
FIG. 21 is a circuit diagram showing the configuration of a power supply circuit of the prior art example.

FIG. 20 is a diagram showing the entire configuration of a display device according to embodiment 5. The present embodiment 5 is similar to embodiment 1, and corresponding parts are accorded like reference numerals. The display device according to embodiment 5 is an active matrix-type EL (electroluminescence) display device. In FIG. 20, reference numeral 80 denotes EL elements, reference numeral 81 denotes current supply lines for supplying driving current to the EL elements 80. In addition, Tra denotes switching transistors serving as pixel switching elements, Trb denotes transistors for driving that function as current controlling elements for controlling current amount to the EL elements. According to embodiment 5, both the switching transistors Tra and the transistors for driving Trb are made of a polycrystalline silicon semiconductor formed on a substrate 28. Note that the current supply lines 81 are connected to a constant current supply (not shown in figure). The power supply for driving the constant current supply may be configured so as to supply current from the power supply circuit 24 or from an external power supply circuit.

Thus, the present invention is not limited to liquid crystal display devices, but may also be applied to EL display devices. However, since capacitively coupled driving cannot be applied to EL display devices, configurations related to voltage controlling capacitors, voltage controlling capacitor wiring, compensation voltage-applying driver circuits, and the like of the liquid crystal display devices of the embodiments described above have been omitted. Thus aspects of the invention relating to liquid crystal display devices having other sub-pixel configurations can be applied to EL display devices.

Supplementary Remarks

In the embodiments described hereinbefore, the level shifter circuit 25 is a built-in circuit formed of a polycrystalline silicon semiconductor, but the level shifter circuit may include an IC chip formed of a monocrystalline silicon semiconductor and formed so as to be mounted on the substrate.

In addition, according to the embodiments described hereinbefore, the source driver circuit 22 is a built-in circuit formed of a polycrystalline silicon semiconductor, but the source driver circuit may comprise an IC chip formed of a polycrystalline silicon semiconductor and formed so as to be mounted on the substrate. If configured in this manner, the thickness of the transistors can be increased and capacitance reduced more than is possible in the case of a built-in circuit, and it is thereby possible to reduce the power consumption of the source driver circuit. Moreover, in the case of a built-in circuit, it is not possible to repair defects, whereas in the case of an IC chip, defects may be repaired by replacing only the defective IC and an improvement in yield thereby realized.

INDUSTRIAL APPLICABILITY

As described hereinbefore, configurations of the present invention exhibit the following advantageous effects.

(1) By using a charge pump-type power supply circuit, the need for a voltage divider circuit such as that of the prior art example is eliminated, making it possible to reduce power loss caused by a voltage divider circuit or the like and to realize a low power consumption liquid crystal display device with a power supply circuit having excellent voltage conversion efficiency.

(2) By integrally forming the power supply circuit on an insulating substrate, connection defects that arise with an external power supply circuit are eliminated, whereby reliability is improved. A reduction in production costs also is realized.

(3) In a liquid crystal display device that employs a system of capacitively coupled driving, by realizing an optimization in the voltage amplitude of the compensation voltage and in the voltage amplitude of the scan signal, power consumption can be reduced to the greatest possible degree and an improvement in aperture ratio realized.

What is claimed is:

1. A display device comprising:
   a display portion having unit pixels arranged in a matrix, each unit pixel having a pixel switching element and a pixel electrode;
   a gate driver circuit for supplying scan signals to gate lines;
   a source driver circuit for supplying image signals to source lines; and
   a power supply circuit for generating power supply voltages for driving the gate driver circuit and the source driver circuit from an inputted reference power supply voltage VDD and for supplying the power supply voltages to drive the gate driver circuit and the source driver circuit;
   wherein the pixel switching elements are thin film transistors made of a polycrystalline silicon semiconductor formed on an insulating substrate;
   the power supply circuit is a charge pump-type power supply circuit and is configured for converting the reference power supply voltage VDD into power supply voltages that are integral multiples of voltage VDD; and
   the power supply circuit comprises a polycrystalline silicon semiconductor and is integrally formed on the insulating substrate.

2. The display device according to claim 1, wherein the display portion is a liquid crystal display portion.

3. The display device according to claim 2, further comprising a compensation voltage-applying driver circuit, wherein:
   each of the unit pixels comprises a voltage controlling capacitor having two electrodes, one electrode connected to the pixel electrode, and comprises voltage controlling capacitor wiring for supplying a compensation voltage signal connected to the other electrode of the voltage controlling capacitor;
   the voltage controlling capacitor wiring is connected to the compensation voltage-applying driver circuit for changing the potential of the compensation voltage signal after completion of writing to each of the pixels to modulate the potentials of the pixel electrodes; and
   the power supply circuit for generating power supply voltages for driving the gate driver circuit and the source driver circuit, and for generating a power supply voltage supplied to the compensation voltage-applying driver circuit.

4. The display device according to claim 3, wherein the gate driver circuit, the source driver circuit, and the compensation voltage-applying driver circuit comprising a polycrystalline silicon semiconductor and are integrally formed on the insulating substrate.

5. The display device according to claim 3, wherein Cs is the capacitance value of the voltage controlling capacitor, and Cs satisfies Equation 1:

$$Cs = (Vbias/Vepp) \cdot Ctot \quad (1)$$

where Vbias is a change in pixel voltage caused by change in the compensation voltage, Vepp is the voltage amplitude of the compensation voltage signal, and Ctot is the sum of the voltage controlling capacitance, parasitic capacitance, and liquid crystal display element capacitance.

6. The display device according to claim 5, wherein the voltage amplitude Vepp of the compensation voltage signal is represented by n times a reference supply voltage inputted to the power supply circuit, where n is a natural number within the range $1 \leq n \leq 4$.

7. The display device according to claim 6, wherein the voltage amplitude of a scan signal is m times the reference power supply voltage, where m is a natural number and is set so that the voltage amplitude of the scan signal is a minimum voltage value in a voltage range in which writing of image signals to the unit pixels is possible.

8. The display device according to claim 1, wherein:
   the display portion is an EL display portion for carrying out display with light emitted from EL elements and unit pixels of the EL display portion each comprise, in addition to the switching element and the pixel electrode, a current controlling element for controlling current magnitude to the EL elements; and
   the current controlling elements are thin film transistors made of a polycrystalline silicon semiconductor formed on an insulating substrate.

9. The display device according to claim 1, wherein the gate driver circuit and the source driver circuit are made of a polycrystalline silicon semiconductor and are integrally formed on the insulating substrate.

10. The display device according to claim 1, wherein the source driver circuit comprises a monocrystalline silicon semiconductor, and the gate driver circuit comprises a polycrystalline silicon semiconductor and is integrally formed on the insulating substrate.

11. The display device according to claim 1, further comprising a level shifter circuit for supplying control signals to the gate driver circuit and the source driver circuit;
   wherein the level shifter circuit comprises a polycrystalline silicon semiconductor and is integrally formed on the insulating substrate.

12. A display device comprising:
   a display portion having unit pixels arranged in a matrix;
   a gate driver circuit for supplying scan signals to the gate lines;
   a source driver circuit for supplying digital image signals to the source lines;
   a power supply circuit for generating power supply voltages for driving the gate driver circuit and the source driver circuit from an inputted reference power supply voltage VDD and for supplying the power supply voltages to drive the gate driver circuit and the source driver circuit;

wherein each of the unit pixels is divided into a plurality of sub-pixels, and each of the sub-pixels has a sub-pixel electrode and a sub-pixel switching element comprising a thin film transistor made of a polycrystalline silicon semiconductor formed on an insulating substrate;

the power supply circuit is a charge pump-type power supply circuit and is configured for converting the reference power supply voltage VDD into power supply voltages that are integral multiples of voltage VDD; and the power supply circuit comprising a polycrystalline silicon semiconductor and is integrally formed on the insulating substrate.

13. The display device according to claim 12, wherein the display portion is a liquid crystal display portion.

14. The display device according to claim 12, wherein:

the display portion is an EL display portion for carrying out display with light emitted from EL elements and sub-pixels of the EL display portion each comprise, in addition to the sub-pixel switching element and the sub-pixel electrode, a current controlling element for controlling current magnitude to the EL elements; and the current controlling element is a thin film transistor made of a polycrystalline silicon semiconductor formed on the insulating substrate.

15. The display device according to claim 12, wherein each of the sub-pixel electrodes has an area corresponding to a weighting of the digital image signals.

16. The display device according to claim 12, further comprising gate lines, source lines and a wiring configuration, wherein the wiring configuration is such that the gate lines are wired to each of the sub-pixels and one of the source lines is commonly wired to all of the sub-pixels.

17. The display device according to claim 13, further comprising a compensation voltage driver circuit, wherein:

each of the sub-pixels comprises a sub-pixel electrode and a voltage controlling capacitor having a first electrode and a second electrode, the first electrode connected to the sub-pixel electrode and comprising voltage controlling capacitor wiring for supplying a compensation voltage signal connected to the second electrode of the voltage controlling capacitor;

the voltage controlling capacitor wiring is connected to a the compensation voltage-applying driver circuit for changing the potential of the compensation voltage signal after completion of writing to each of the sub-pixels to modulate the potential of the sub-pixel electrodes; and the power supply circuit, in addition to generating power supply voltages for driving the gate driver circuit and the source driver circuit, is for generating a power supply voltage supplied to the compensation voltage-applying driver circuit.

18. The display device according to claim 17, wherein each of the sub-pixel electrodes has an area corresponding to a weighting of the digital image signals.

19. The display device according to claim 17, wherein the sub-pixel switching elements each have an ON current efficiency corresponding to a weighting of the digital image signals.

20. The display device according to claim 17, wherein each of the voltage controlling capacitors has a capacitance value corresponding to a weighting of the digital image signals.

21. The display device according to claim 17, further comprising a pixel electrode, wherein a storage capacitor is located between each upstream gate line of the gate lines and the corresponding pixel electrode.

* * * * *

UNITED STATES PATENT AND TRADEMARK OFFICE
CERTIFICATE OF CORRECTION

PATENT NO. : 6,909,413 B2
DATED : June 21, 2005
INVENTOR(S) : Yutaka Nanno et al.

It is certified that error appears in the above-identified patent and that said Letters Patent is hereby corrected as shown below:

Column 22,
Lines 8-9, change "connected to a the" to -- connected to the --.

Signed and Sealed this

Fourth Day of April, 2006

JON W. DUDAS
*Director of the United States Patent and Trademark Office*